(12) United States Patent
Lee et al.

(10) Patent No.: US 12,352,273 B2
(45) Date of Patent: Jul. 8, 2025

(54) MOTOR DRIVING APPARATUS AND AIR CONDITIONER INCLUDING THE SAME

(71) Applicant: LG Electronics Inc., Seoul (KR)

(72) Inventors: Yonghwa Lee, Seoul (KR); Sanghyeon Kim, Seoul (KR); Jeongeon Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 17/570,910

(22) Filed: Jan. 7, 2022

(65) Prior Publication Data

US 2022/0220966 A1 Jul. 14, 2022

(30) Foreign Application Priority Data

Jan. 8, 2021 (KR) .................. 10-2021-0002688

(51) Int. Cl.
*F04D 25/06* (2006.01)
*H02M 1/08* (2006.01)
*H02M 3/158* (2006.01)

(52) U.S. Cl.
CPC ..... *F04D 25/0666* (2013.01); *F04D 25/0693* (2013.01); *H02M 1/08* (2013.01); *H02M 3/158* (2013.01); *F25B 2600/021* (2013.01)

(58) Field of Classification Search
CPC .......... F25B 2600/021; F25B 2600/024; F25B 2600/025; H02P 27/085; H02P 27/06; H02P 25/184
See application file for complete search history.

(56) References Cited

U.S. PATENT DOCUMENTS

| 5,013,990 A | * | 5/1991 | Weber | H02P 23/26 318/822 |
| 8,183,814 B2 | * | 5/2012 | Fuchs | H02P 25/20 318/524 |

(Continued)

FOREIGN PATENT DOCUMENTS

| CN | 103795304 A | 5/2014 |
| CN | 105227016 A | 1/2016 |

(Continued)

OTHER PUBLICATIONS

Extended European Search Report in European Appln. No. 22150298. 2, dated May 31, 2022, 13 pages.

(Continued)

*Primary Examiner* — Christopher S Bobish
(74) *Attorney, Agent, or Firm* — Fish & Richardson P.C.

(57) ABSTRACT

The present disclosure relates to a motor driving apparatus and an air conditioner including the same. The motor driving apparatus and the air conditioner including the same according to an embodiment of the present disclosure include: a switching device disposed between an inverter and a motor; and a controller, which in response to windings of the motor being switched from a first connection to a second connection, controls an operating frequency of the motor to be less than or equal to a first frequency, and in response to the windings of the motor being switched from the second connection to the first connection, controls an operating frequency of the motor to be less than or equal to a second frequency which is less than the first frequency. Accordingly, burnout of the switching device for switching connection of the motor windings may be prevented.

16 Claims, 22 Drawing Sheets

(56) References Cited

U.S. PATENT DOCUMENTS

| | | | | |
|---|---|---|---|---|
| 10,951,139 B2* | 3/2021 | Hirosawa | .............. | H02P 25/184 |
| 11,150,000 B2* | 10/2021 | Sakabe | .................. | F25B 13/00 |
| 11,329,587 B2* | 5/2022 | Tsuchiya | .......... | H02M 7/53871 |
| 11,486,614 B2* | 11/2022 | Qiao | ........................ | H02K 7/14 |
| 11,711,040 B2* | 7/2023 | Toyodome | .............. | H02P 21/22 |
| | | | | 318/400.02 |
| 2015/0168033 A1* | 6/2015 | Yamakawa | ............. | H02P 27/02 |
| | | | | 62/324.6 |
| 2019/0245471 A1* | 8/2019 | Nigo | ........................ | H02P 25/18 |
| 2019/0348941 A1* | 11/2019 | Arisawa | .............. | H02M 7/5387 |
| 2020/0021222 A1* | 1/2020 | Nigo | ..................... | H02P 25/184 |
| 2020/0177114 A1* | 6/2020 | Hirosawa | .............. | H02P 27/085 |
| 2020/0186073 A1* | 6/2020 | Nigo | ........................ | F25B 1/00 |

FOREIGN PATENT DOCUMENTS

| | | | |
|---|---|---|---|
| CN | 110892634 A | 3/2020 | |
| CN | 110892636 A | 3/2020 | |
| EP | 2955456 | 12/2015 | |
| JP | 2019-038365 A | 3/2019 | |
| WO | 2016030941 A1 | 3/2016 | |

OTHER PUBLICATIONS

Office Action in Chinese Appln. No. 202210009938.4, mailed on Oct. 24, 2024, 16 pages (with English translation).

Office Action in Korean Appln. No. 10-2021-0002688, mailed on May 20, 2025, 26 pages (with English translation).

* cited by examiner (a)

(b)

(a)

(b)

MOTOR DRIVING APPARATUS AND AIR CONDITIONER INCLUDING THE SAME

CROSS-REFERENCE TO RELATED APPLICATION

This application claims the priority benefit of Korean Patent Application No. 10-2021-0002688, filed on Jan. 8, 2021, in the Korean Intellectual Property Office, the disclosure of which is incorporated herein by reference.

BACKGROUND OF THE PRESENT DISCLOSURE

1. Field of the Invention

The present disclosure relates to a motor driving apparatus and an air conditioner including the same, and more particularly to a motor driving apparatus capable of preventing burnout of a switching device for switching connection of motor windings, and an air conditioner including the same.

2. Description of the Related Art

An air conditioner is an apparatus that discharges cool or hot air into a room in order to adjust room temperature and to purify air in the room, thereby providing a comfortable room environment to users. Generally, the air conditioner includes an indoor device installed in the room, the indoor device including a heat exchanger, and an outdoor device for supplying refrigerant to the indoor device, the outdoor device including a compressor and a heat exchanger.

PCT Publication No. WO19-008756 (hereinafter referred to as a "prior art") discloses a switching device for switching motor windings to Y-connection and Δ-connection in order to improve power conversion efficiency or a motor driving efficiency when a compressor motor of a compressor is driven.

However, in the prior art, a mechanical switch or an electrical switch is required as the switching device in order to switch windings of the motor to Y-connection and Δ-connection, and when repeatedly used, the switch may be damaged or its life may be degraded.

SUMMARY OF THE PRESENT DISCLOSURE

It is an object of the present disclosure to provide a motor driving apparatus capable of preventing burnout of a switching device for switching connection of a motor, and an air conditioner including the same.

It is another object of the present disclosure to provide a motor driving apparatus capable of preventing burnout of an inverter, and an air conditioner including the same.

It is another object of the present disclosure to provide a motor driving apparatus capable of controlling a brake chopper circuit at a DC terminal not to operate during the operation of the switching device.

In accordance with an aspect of the present disclosure, the above and other objects can be accomplished by providing a motor driving apparatus and an air conditioner including the same, which include: an inverter having a plurality of switching elements, and configured to output alternating current (AC) power to a motor based on a switching operation; a switching device disposed between the inverter and the motor, and configured to switch windings of the motor to a first connection or a second connection; and a controller configured to control the inverter and the switching device, wherein in response to the windings of the motor being switched from the first connection to the second connection, the controller controls an operating frequency of the motor to be less than or equal to a first frequency, and in response to the windings of the motor being switched from the second connection to the first connection, the controller controls an operating frequency of the motor to be less than or equal to a second frequency which is less than the first frequency.

Meanwhile, the motor driving apparatus and the air conditioner including the same according to an embodiment of the present disclosure may further include: a DC terminal capacitor configured to store a DC terminal voltage; a DC terminal voltage detector configured to detect the DC terminal voltage; and a brake chopper circuit connected to both ends of the DC terminal capacitor and having a resistor and a switching element.

Meanwhile, in response to the windings of the motor being switched from the first connection to the second connection, the controller may control the operating frequency of the motor to be less than or equal to the first frequency for the detected DC terminal voltage to be less than or equal to an allowable voltage.

Meanwhile, in response to the windings of the motor being switched from the first connection to the second connection, the controller controls an output of the inverter to be stopped, wherein after the output of the inverter is stopped, a regenerative current from the motor is supplied to the DC terminal through the switching device and the inverter, and wherein the controller controls the operating frequency of the motor to be less than or equal to the first frequency during the supply of the regenerative current for the detected DC terminal voltage to be less than or equal to the allowable voltage.

Meanwhile, in response to the windings of the motor being switched from the first connection to the second connection, the controller may control the operating frequency of the motor to decrease to the first frequency or less for the switching element in the brake chopper circuit not to be turned on.

Meanwhile, in response to the windings of the motor being switched from the first connection to the second connection, the controller may control an output of the inverter to be stopped, and may control a first regenerative current from the motor to be supplied to the DC terminal, and then a second regenerative current, which is lower than the first regenerative current, to be supplied to the DC terminal for the switching element in the brake chopper circuit not to be turned on that after the output of the inverter is stopped.

Meanwhile, in response to the windings of the motor being switched from the second connection to the first connection, the controller may control the operating frequency of the motor to be less than or equal to the second frequency for the detected DC terminal voltage to be less than or equal to the allowable range.

Meanwhile, in response to the windings of the motor being switched from the second connection to the first connection, the controller may control an output of the inverter to be stopped, and wherein after the output of the inverter is stopped, a regenerative current from the motor may be supplied to the DC terminal through the switching device and the inverter, and wherein the controller may control the operating frequency of the motor to be less than or equal to the second frequency during the supply of the regenerative current for the detected DC terminal voltage to be less than or equal to the allowable voltage.

Meanwhile, in response to the windings of the motor being switched from the second connection to the first connection, the controller may control the operating frequency of the motor to decrease to the second frequency or less for the switching element in the brake chopper circuit not to be turned on.

Meanwhile, in response to the windings of the motor being switched from the second connection to the first connection, the controller may control an output of the inverter to be stopped, and may control a third regenerative current from the motor to be supplied to the DC terminal, and then a fourth regenerative current, which is lower than the third regenerative current, to be supplied to the DC terminal for the switching element in the brake chopper circuit not to be turned on that after the output of the inverter is stopped.

Meanwhile, the controller may control an operating frequency range of the motor, during switching of the windings of the motor from the first connection to the second connection, to be greater than an operating frequency range of the motor during switching of the windings of the motor from the second connection to the first connection.

Meanwhile, in response to the windings of the motor being switched from the first connection to the second connection, the controller may control the operating frequency of the motor to be greater than or equal to a first reference frequency, and in response to the windings of the motor being switched from the second connection to the first connection, the controller may control the operating frequency of the motor to be greater than or equal to a second reference frequency.

Meanwhile, the motor driving apparatus and the air conditioner including the same according to an embodiment of the present disclosure may further include a temperature detector attached to the inverter and configured to detect temperature of the inverter, wherein in response to the windings of the motor being switched from the first connection to the second connection, the controller may control the temperature of the inverter to be less than or equal to the first reference temperature, and in response to the windings of the motor being switched from the second connection to the first connection, the controller may control the temperature of the inverter to be less than or equal to the second reference temperature which is higher than the first reference temperature.

In accordance with another aspect of the present disclosure, the above and other objects can be accomplished by providing a motor driving apparatus and an air conditioner including the same, which include: an inverter having a plurality of switching elements, and configured to output alternating current (AC) power to a motor based on a switching operation; a temperature detector attached to the inverter, and configured to detect temperature of the inverter; a switching device disposed between the inverter and the motor, and configured to switch windings of the motor to a first connection or a second connection; and a controller configured to control the inverter and the switching device, wherein in response to the windings of the motor being switched from the first connection to the second connection, the controller may control the temperature of the inverter to be less than or equal to a first reference temperature, and in response to the windings of the motor being switched from the second connection to the first connection, the controller may control the temperature of the inverter to be less than or equal to a second reference temperature which is higher than the first reference temperature.

Meanwhile, the motor driving apparatus and the air conditioner including the same according to an embodiment of the present disclosure may further include: a DC terminal capacitor configured to store a DC terminal voltage; a DC terminal voltage detector configured to detect the DC terminal voltage; and a brake chopper circuit connected to both ends of the DC terminal capacitor and having a resistor and a switching element, wherein in response to the windings of the motor being switched from the second connection to the first connection, the controller controls the temperature of the inverter to be less than or equal to the second reference temperature for the detected DC terminal voltage to be less than or equal to an allowable voltage.

Meanwhile, in response to the windings of the motor being switched from the first connection to the second connection, the controller may control an output of the inverter to be stopped, and wherein after the output of the inverter is stopped, a regenerative current from the motor may be supplied to the DC terminal through the switching device and the inverter, and wherein the controller may control the temperature of the inverter to be less than or equal to the second reference temperature during the supply of the regenerative current for the detected DC terminal voltage to be less than or equal to the allowable voltage.

Meanwhile, in response to the windings of the motor being switched from the first connection to the second connection, the controller may control the temperature of the inverter to decrease to the first reference temperature or less for the switching element in the brake chopper circuit not to be turned on.

Meanwhile, in response to the windings of the motor being switched from the first connection to the second connection, the controller may control an output of the inverter to be stopped, and may control a first regenerative current from the motor to be supplied to the DC terminal, and then a second regenerative current, which is lower than the first regenerative current, to be supplied to the DC terminal for the switching element in the brake chopper circuit not to be turned on that after the output of the inverter is stopped.

Meanwhile, in response to the windings of the motor being switched from the second connection to the first connection, the controller may control the temperature of the inverter to be less than or equal to the second reference temperature for the detected DC terminal voltage to be less than or equal to the allowable voltage.

Meanwhile, in response to the windings of the motor being switched from the second connection to the first connection, the controller may control an output of the inverter to be stopped, and wherein after the output of the inverter is stopped, a regenerative current from the motor may be supplied to the DC terminal through the switching device and the inverter, and wherein the controller may control the temperature of the inverter to be less than or equal to the second reference temperature during the supply of the regenerative current for the detected DC terminal voltage to be less than or equal to the allowable voltage.

Meanwhile, in response to the windings of the motor being switched from the second connection to the first connection, the controller may control the temperature of the inverter to decrease to the second reference temperature or less for the switching element in the brake chopper circuit not to be turned on.

Meanwhile, in response to the windings of the motor being switched from the second connection to the first connection, the controller may control an output of the inverter to be stopped, and may control a third regenerative current from the motor to be supplied to the DC terminal, and then a fourth regenerative current, which is lower than the third regenerative current, to be supplied to the DC terminal for the switching element in the brake chopper circuit not to be turned on that after the output of the inverter is stopped.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Exemplary embodiments of the present disclosure will be described with reference to the accompanying drawings.

The terms "module" and "unit," when attached to the names of components are used herein to help the understanding of the components and thus they should not be considered as having specific meanings or roles. Accordingly, the terms "module" and "unit" may be used interchangeably.

Figure 1:
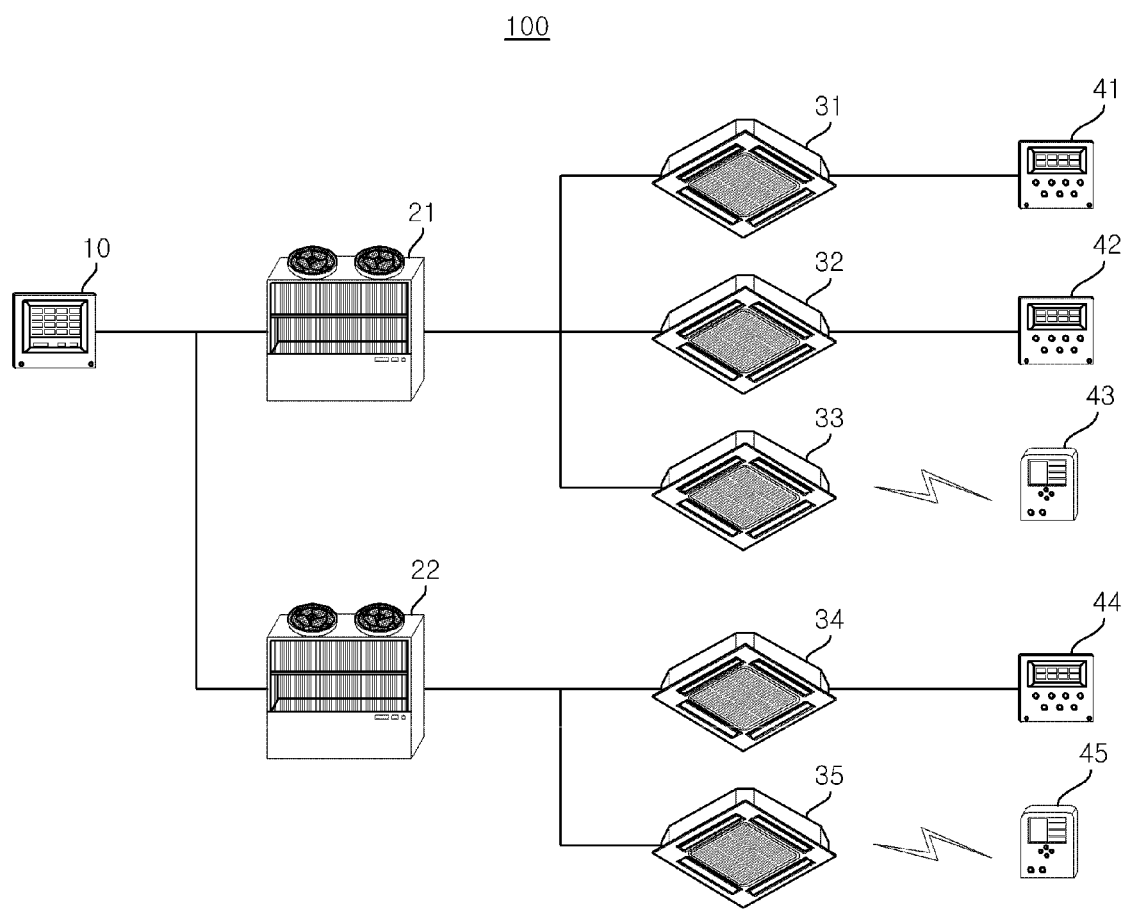
FIG. 1 is a view showing the construction of an air conditioner according to an embodiment of the present disclosure.

FIG. 1 is a view showing the construction of an air conditioner according to an embodiment of the present disclosure.

As illustrated in FIG. 1, the air conditioner according to the embodiment of the present disclosure is a large-sized air conditioner 100, and may include a plurality of indoor devices 31 to 35, a plurality of outdoor devices 21 and 22 connected to the plurality of indoor devices 31 to 35, a plurality of remote controls 41 to 45 connected to the respective indoor devices, and a remote controller 10 for controlling the plurality of indoor devices and outdoor devices.

The remote controller 10 may be connected to the plurality of indoor devices 31 to 36 and the plurality of outdoor devices 21 and 22 to monitor and control operations thereof. In this case, the remote controller 10 may be connected to the plurality of indoor devices to perform operation setting, locking setting, schedule control, group control, and the like.

Any one of a stand type air conditioner, a wall mount type air conditioner, and a ceiling type air conditioner may be used as the air conditioner 100, but a ceiling type air conditioner will be described below by way of example, for the convenience of description.

In addition, the air conditioner may further include at least one of a ventilator, an air purifier, a humidifier, and a heater, which may be operated in response to the operations of the indoor devices and the outdoor devices.

The outdoor devices 21 and 22 may include a compressor (not shown) for receiving and compressing a refrigerant, an outdoor heat exchanger (not shown) for heat exchange between the refrigerant and outside air, an accumulator (not shown) for extracting a gaseous refrigerant from the received refrigerant and supplying the refrigerant to the compressor, and a four-way valve (not shown) for selecting a refrigerant passage for a heating operation. In addition, the outdoor devices 21 and 22 may further include a plurality of sensors, valves, an oil recovery unit, etc., but a description thereof will be omitted below.

The outdoor devices 21 and 22 operate the compressor and the outdoor heat exchanger included therein, to compress or heat exchange the refrigerant according to a setting, and supply the refrigerant to the indoor devices 31 to 35. The outdoor devices 21 and 22 are driven by a request from the remote controller 10 or the indoor devices 31 to 35, and a cooling/heating capacity changes according to the driven outdoor devices, such that a number of operating outdoor devices and a number of operating compressors installed in the outdoor devices may change.

In this case, the following description will be made based on an example in which the plurality of outdoor devices 21 and 22 respectively supply the refrigerant to each of the indoor devices connected thereto, but depending on a connection structure of the outdoor devices and the indoor devices, the plurality of outdoor devices may be connected to each other to supply the refrigerant to the plurality of indoor devices.

The indoor devices 31 to 35 may be connected to any one of the plurality of outdoor devices 21 and 22, to be supplied with the refrigerant and to discharge cool or hot air into a room. The indoor devices 31 to 35 include an indoor heat exchanger (not shown), an indoor fan (not shown), an expansion valve (not shown) in which the supplied refrigerant is expanded, and a plurality of sensors (not shown).

In this case, the outdoor devices 21 and 22 and the indoor devices 31 to 35 may be connected to each other via a communication line to transmit and receive data therebetween, and the outdoor devices 21 and 22 and the indoor devices 31 to 35 may be connected to the remote controller 10 via another communication line to operate under the control of the remote controller 10.

The remote controls 41 to 45, which are connected to the respective indoor devices, may transmit a user's control command to the indoor devices, and may receive and display information about the state of the indoor devices. In this case, the remote controls communicate by wire or wirelessly with the indoor devices depending on the manner in which the input devices are connected to the indoor devices, and in some cases a single remote control may be connected to the plurality of indoor devices such that settings of the plurality of indoor devices may be changed by the input of the single remote control.

In addition, each of the remote controls 41 to 45 may include a temperature sensor provided therein.

Figure 2:
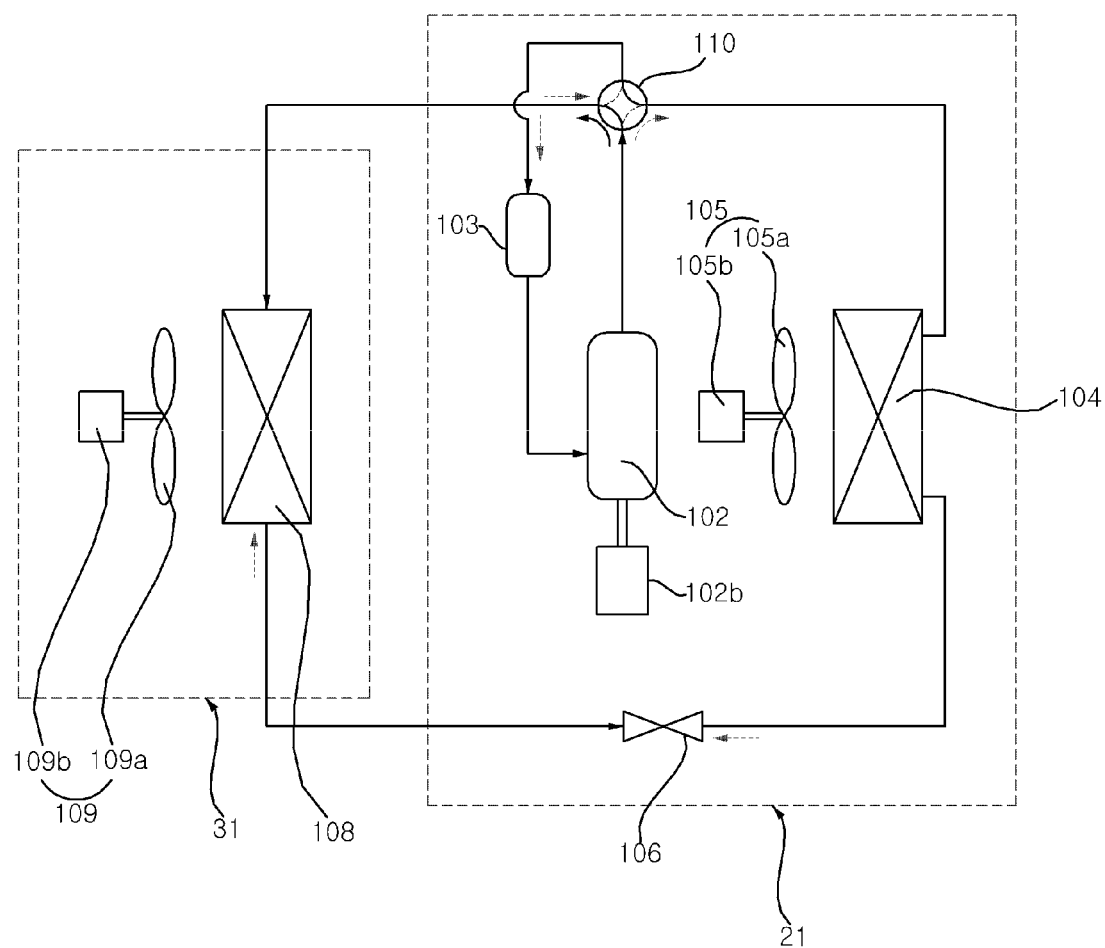
FIG. 2 is a schematic view showing an outdoor device and an indoor device of FIG. 1.

FIG. 2 is a schematic view showing an outdoor device and an indoor device of FIG. 1.

Referring to the drawing, the air conditioner 100 is basically divided into an indoor device 31 and an outdoor device 21.

The outdoor device 21 includes a compressor 102 for compressing refrigerant, a compressor motor 102b for driving the compressor, an outdoor heat exchanger 104 for cooling the compressed refrigerant, an outdoor blower 105 including an outdoor fan 105a disposed at one side of the outdoor heat exchanger 104 for accelerating the cooling of the refrigerant and a motor 105b for rotating the outdoor fan 105a, an expansion valve 106 for expanding the condensed refrigerant, a cooling/heating switch valve 110 for changing the path of the compressed refrigerant, and an accumulator 103 for temporarily storing the gaseous refrigerant, removing moisture and foreign matter from the refrigerant, and supplying the refrigerant to the compressor under a predetermined pressure.

An indoor device 31 includes an indoor heat exchanger 109 disposed in a room for performing cooling/heating and an indoor heat exchanger 109 including an indoor fan 109a disposed at one side of the indoor heat exchanger 109 for accelerating the cooling of the refrigerant and a motor 109b for rotating the indoor fan 109a.

At least one indoor heat exchanger 109 may be installed. An inverter compressor or a fixed speed compressor may be used as the compressor 102.

In addition, the air conditioner 100 may be configured as a cooler for cooling a room or as a heat pump for cooling or heating a room.

A single indoor device 30a and a single outdoor device 20 are shown in FIG. 2. However, the present disclosure is not limited thereto. The present disclosure may also be applied to a multi-type air conditioner including a plurality of indoor devices and a plurality of outdoor devices or an air conditioner including a single indoor device and a plurality of outdoor devices.

The compressor 102 in the outdoor device 21 may be driven by a motor driving apparatus 220 for compressor driving, which drives a compressor motor 230.

Figure 3:
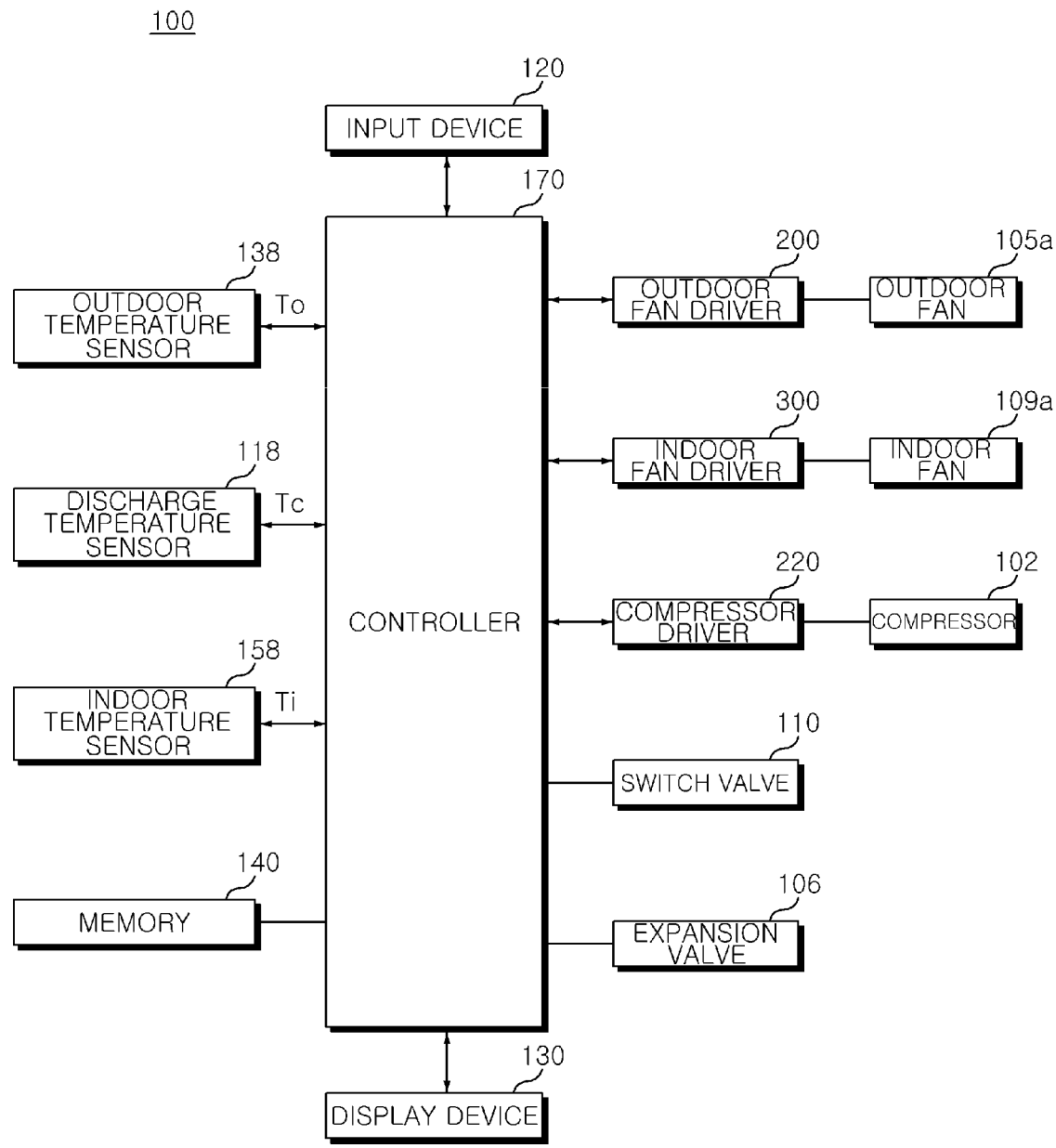
FIG. 3 is an internal block diagram schematically illustrating the air conditioner of FIG. 1.

FIG. 3 is an internal block diagram schematically illustrating the air conditioner of FIG. 1.

Referring to the drawing, the air conditioner 100 of FIG. 3 includes the compressor 102, an outdoor fan 105a, an indoor fan 109a, a controller 170, a discharge temperature sensor 118, an outdoor temperature sensor 138, an indoor temperature sensor 158, and a memory 140.

In addition, the air conditioner 100 may further include a compressor driver 220, an outdoor fan driver 200, an indoor fan driver 300, a switch valve 110, an expansion valve 106, a display device 130, and an input device 120.

The compressor 102, the outdoor fan 105a, and the indoor fan 109a are described above with reference to FIG. 2.

The input device 120 has a plurality of operation buttons, and transmits a signal for an operating target temperature of the air conditioner 100 to the controller 170.

The display device 130 may display an operating state of the air conditioner 100.

The memory 140 may store data required for the operation of the air conditioner 100.

The discharge temperature sensor 118 may sense refrigerant discharge temperature Tc at the compressor 102, and may transmit a signal for the sensed refrigerant discharge temperature Tc to the controller 170.

The outdoor temperature sensor 138 may sense outdoor temperature To, which is ambient temperature around the outdoor device 21 of the air conditioner 100, and may transmit a signal for the sensed outdoor temperature To to the controller 170.

The indoor temperature sensor 158 may sense indoor temperature Ti, which is ambient temperature around the indoor device 31 of the air conditioner 100, and may transmit a signal for the sensed indoor temperature Ti to the controller 170.

The controller 170 may control the air conditioner 100 to operate based on at least one of the sensed refrigerant discharge temperature Tc, the sensed outdoor temperature To, and the sensed indoor temperature Ti, and the input target temperature. For example, the controller 170 may control the air conditioner 100 to operate by calculating a final target superheat degree.

Further, in order to control operations of the compressor 102, the indoor fan 109a, and the outdoor fan 105a, the controller 170 may control the compressor driver 220, the outdoor fan driver 200, and the indoor fan driver 300, respectively, as illustrated herein.

For example, the controller 170 may output a corresponding speed reference signal to the compressor driver 220, the outdoor fan driver 200, or the indoor fan driver 300 based on the target temperature.

Further, based on each speed reference signal, the compressor motor (not shown), the motor 230, the indoor fan motor 109b may operate at each target rotation speed.

The controller 170 may control the overall operation of the air conditioner 100, in addition to the control of the compressor driver 220, the outdoor fan driver 200, or the indoor fan driver 300.

For example, the controller 170 may control the operation of the cooling/heating switch valve 110 or a four-way valve.

Alternatively, the controller 170 may control the operation of expansion equipment or the expansion valve 106.

Figure 4:
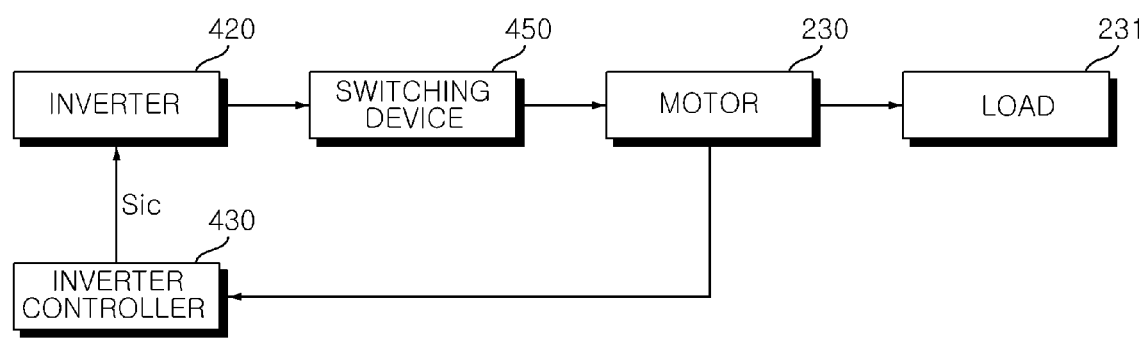
FIG. 4 is an internal block diagram illustrating a motor driving apparatus according to an embodiment of the present disclosure.
Figure 5:
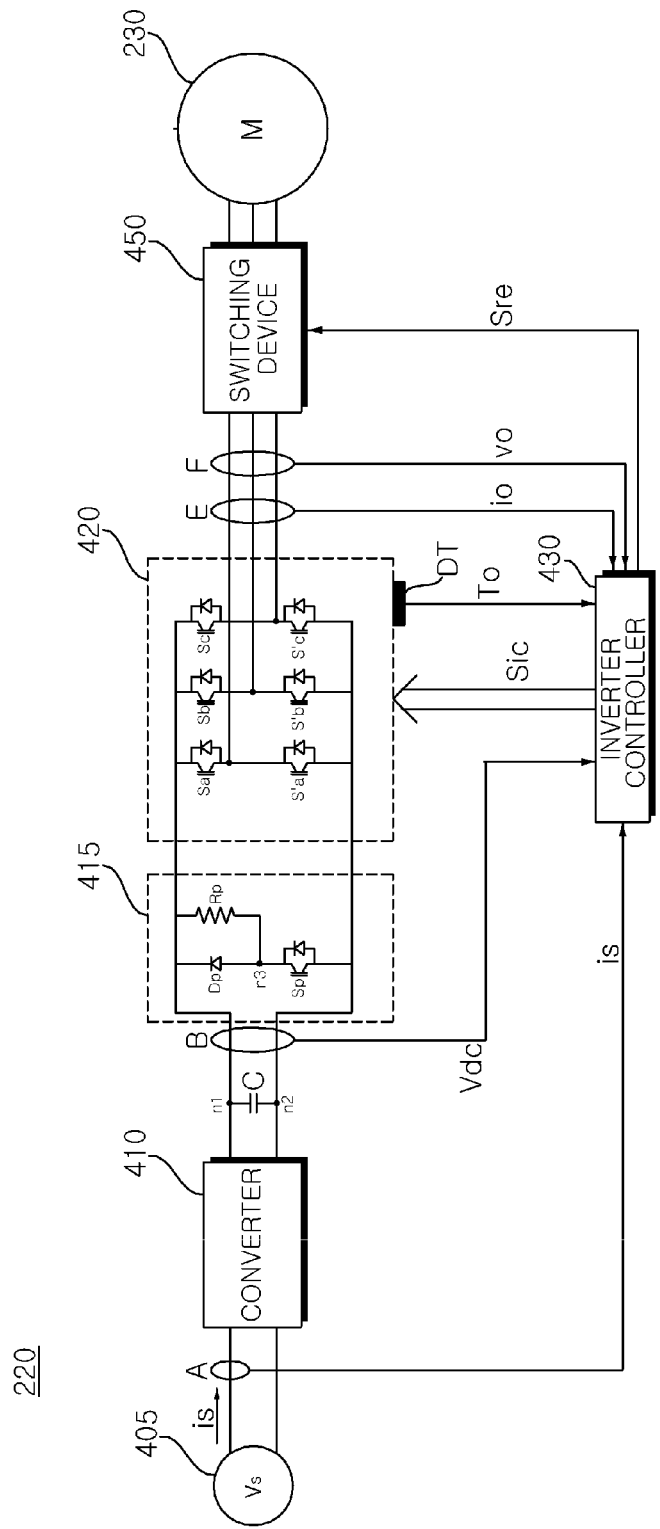
FIG. 5 is an internal circuit diagram illustrating the motor driving apparatus of FIG. 4.

FIG. 4 is an internal block diagram illustrating a motor driving apparatus according to an embodiment of the present disclosure; and FIG. 5 is an internal circuit diagram illustrating the motor driving apparatus of FIG. 4.

Referring to the drawings, the motor driving apparatus 220 according to an embodiment of the present disclosure is used for driving a motor in a sensorless mode, and may be referred to as a power conversion device.

The motor driving apparatus 220 according to the embodiment of the present disclosure may include a converter 410, a brake chopper circuit 415, an inverter 420, an inverter controller 430, a switching device 450, a DC terminal voltage detector B, a DC terminal capacitor C, an output current detector E, and an output voltage detector F. In addition, the motor diving apparatus 220 may further include an input current detector A and the like.

The input current detector A may detect an input current $i_s$ input from a commercial AC power source 405. To this end, a current transformer (CT), shunt resistor and the like may be used as the input current detector A. The detected input current $i_s$, which is a pulse type discrete signal, may be input to the inverter controller 430.

The converter 410 converts a voltage, having output from the commercial AC power source 405 and passed through the reactor L, into a DC voltage, and outputs the DC voltage. While the commercial AC power source 405 is shown as a three-phase AC power source, the commercial AC power may also be a single-phase AC power source. The internal structure of the converter 410 may change according to the type of the commercial AC power source 405.

The converter 410 may include diodes without a switching element, such that the converter 410 may perform a rectification operation without performing a separate switching operation.

For example, six diodes may be arranged in the form of a bridge for the three-phase AC power source, and four diodes may be arranged in the form of a bridge for the single-phase AC power source.

The converter 410 may include six switching elements and six diodes for the three-phase AC power source, and in the case of single-phase AC power, a half-bridge type converter having two switching elements and four diodes may be used as the converter 410.

When the converter 410 is provided with switching elements, the converter 410 may perform voltage boosting, power factor improvement, and DC voltage conversion according to a switching operation of the switching element.

The DC terminal capacitor C is disposed at the DC terminal, and stores the voltage output from the converter 410. In the drawing, a single device is exemplified as the dc terminal capacitor C, but a plurality of devices may be provided to ensure device stability.

Further, while it is illustrated that the DC terminal capacitor C is connected to the output terminal of the converter 410, the present disclosure is not limited thereto, and a DC voltage may be directly input to the DC terminal capacitor C.

For example, a DC voltage from a solar cell may be directly input to the DC terminal capacitor C or may be DC/DC converted and then input to the DC terminal capacitor C. The following description will be based on parts illustrated in the figure.

Both terminals n1-n2 of the DC terminal capacitor may be referred to as DC terminals or DC link terminals since DC voltage is stored in the DC terminal capacitor.

The dc terminal voltage detector B may detect a voltage Vdc applied between both terminals of the DC terminal capacitor C. To this end, the DC terminal voltage detector B may include a resistor, an amplifier, and the like. The detected DC terminal voltage Vdc, which is a pulse type discrete signal, may be input to the controller 430.

The brake chopper circuit 415 is disposed at both ends of the dc terminal capacitor C, and may include a resistor Rp and switching elements Sp.

Specifically, a diode element Dp and the resistor element Rp are connected in parallel to each other at one end n1 of the do terminal capacitor C, and the switching element Sp is connected to the other end n2 of the dc terminal capacitor C.

A cathode terminal of the diode element Dp is connected to the one end n1 of the dc terminal capacitor C, and an anode terminal of the diode element Dp is connected to a terminal n3 between the resistor element Rp and the switching element Sp.

If a dc terminal voltage Vdc exceeds an allowable voltage, the brake chopper circuit 415 operates, and if a dc terminal voltage Vdc is less than or equal to the allowable voltage, the brake chopper circuit 415 does not operate.

Specifically, if the dc terminal voltage Vdc exceeds the allowable voltage, the switching element Sp of the brake chopper circuit 415 is turned on, such that a current flows through the resistor element Rp and the switching element Sp, and thus the dc terminal voltage Vdc decreases.

By contrast, if the dc terminal voltage Vdc is less than or equal to the allowable voltage, the switching element Sp of the brake chopper circuit 415 is turned off, such that no current flows through the resistor element Rp and the switching element Sp.

By the operation of the brake chopper circuit 415, it is possible to prevent the dc terminal voltage from rapidly rising due to a regenerative current, thereby preventing burnout of the dc terminal capacitor C and the like.

Particularly, the burnout of the dc terminal capacitor C and the like may be prevented when the dc terminal capacitor C is implemented as a film capacitor.

The inverter 420 may include a plurality of inverter switching elements Sa~Sc and S'a~S'c, and may convert the DC voltage Vdc at the DC terminal into three-phase AC voltages Va, Vb, and Vc according to on/off operations of the switching element Sa~Sc and S'a~S'c and output the voltages to the three-phase synchronous motor 250.

In the inverter 420, the upper arm switching element Sa, Sb, Sc and the lower arm switching element S'a, S'b, and S'c which are connected in series with each other form a pair, and a total of three pairs of upper and lower arm switching elements are connected in parallel with each other Sa&S'a, Sb&S'b, and Sc&S'c. Diodes are connected in reverse parallel to each of the switching elements Sa, S'a, Sb, S'b, Sc, and S'c.

The switching elements in the inverter 420 are turned on/off based on the inverter switching control signal Sic from the inverter controller 430. Thus, the three-phase AC voltages of predetermined frequencies are output to the three-phase synchronous motor 230.

The temperature detector DT is attached to the inverter 420 to detect temperature of the inverter 420. The detected temperature may be transmitted to the inverter controller 430.

The inverter controller 430 may control the switching operation of the inverter 420 in a sensorless mode. To this end, the inverter controller 430 may receive an output current io detected by the output current detector E.

In order to control the switching operation of the inverter 420, the inverter controller 430 may output an inverter switching control signal Sic to the inverter 420. The inverter switching control signal Sic is a pulse width modulation (PWM)-based switching control signal, and is generated based on the output current io detected by the output current detector E and the generated signal is output. An operation of outputting the inverter switching control signal Sic in the inverter controller 430 will be descried in detail later with reference to FIG. 6.

The output current detector E detects the output current io flowing between the inverter 420 and the three-phase motor 230. That is, the output current detector E detects a current flowing through the motor 230. The output current detector E may detect all three phase output currents ia, ib, and ic, or may detect two phase output currents using three phase equilibrium.

The output current detector E may be disposed between the inverter 420 and the motor 230, and may use a current transformer (CT), a shunt resistor, and so on for current detection.

When the shunt resistor is used, three shunt resistors may be disposed between the inverter 420 and the synchronous motor 230, or one end thereof may be connected to the respective three lower arm switching element S'a, S'b, and S'c of the inverter 420.

Further, two shunt resistors may also be used based on three phase equilibrium. In the case where one shunt resistor is used, the shunt resistor may be disposed between the capacitor C and the inverter 420.

The detected output current io, which is a pulse type discrete signal, may be applied to the inverter controller 430, and the inverter switching control signal Sic may be generated based on the detected output current io. In the following description, the detected output current io may correspond to three-phase output currents ia, ib, and ic.

The output voltage detector F may detect an output voltage vo output from the inverter 420. Specifically, the output voltage detector F may detect each phase output voltage vo output from the inverter. To this end, the output voltage detector F may include a resistor, an amplifier, and the like. The detected output voltage vo, as a pulse type discrete signal, may be input to the inverter controller 430.

The three-phase motor 230 includes a stator and a rotor. All three phase AC voltages of predetermined frequencies are applied to coils of all three phase (a-phase, b-phase, and c-phase) stators to rotate the rotor.

For example, the motor 230 can include a surface-mounted permanent-magnet synchronous motor (SMPMSM), an interior permanent magnet synchronous motor (IPMSM), a synchronous reluctance motor (Synrm) and the like. The SMPMSM and IPMSM are permanent magnet synchronous motors (PMSMs) employing a permanent magnet and the Synrm has no permanent magnet.

Further, the switching device 450 is disposed between the inverter 420 and the motor 230, and may switch windings of the motor 230 to a first connection or a second connection.

Here, the first connection may be Y-connection, and the second connection may be Δ-connection.

To this end, the switching device 450 may include three relay devices SW1 to SW3 respectively connected between three-phase output terminals of the inverter 420 and three-phase coils CA, Cb, and CC.

That is, the switching device 450 may include first to third relay devices SW1 to SW3 which are electrically connected to the respective phase outputs.

If the motor 230 operates at a speed less than or equal to a first speed or a first operating frequency, the switching device 450 may operate for the motor 230 to be in the first connection; and if the motor 230 operates at a speed exceeding the first speed or the first operating frequency, the switching device 450 may operate for the motor 230 to be in the second connection, thereby increasing power conversion efficiency or motor driving efficiency.

Particularly, at a low speed less than or equal to the first speed or the first operating frequency, the power conversion efficiency or motor driving efficiency may be improved.

Further, the motor driving device 220 according to an embodiment of the present disclosure includes: the switching device 450 disposed between the motor 230 and the inverter 420; the controller 170, which when windings of the motor 230 are switched from the first connection to the second connection, controls the operating frequency of the motor 230 to be less than or equal to the first frequency, and when windings of the motor 230 are switched from the second connection to the first connection, controls the operating frequency of the motor 230 to be less than or equal to a second frequency which is less than the first frequency. Accordingly, burnout of the switching device 450 for switching connection of windings of the motor 230 may be prevented, as well as burnout of the inverter 420. A detailed description thereof will be made later with reference to FIG. 7 and the following figures.

Figure 6:
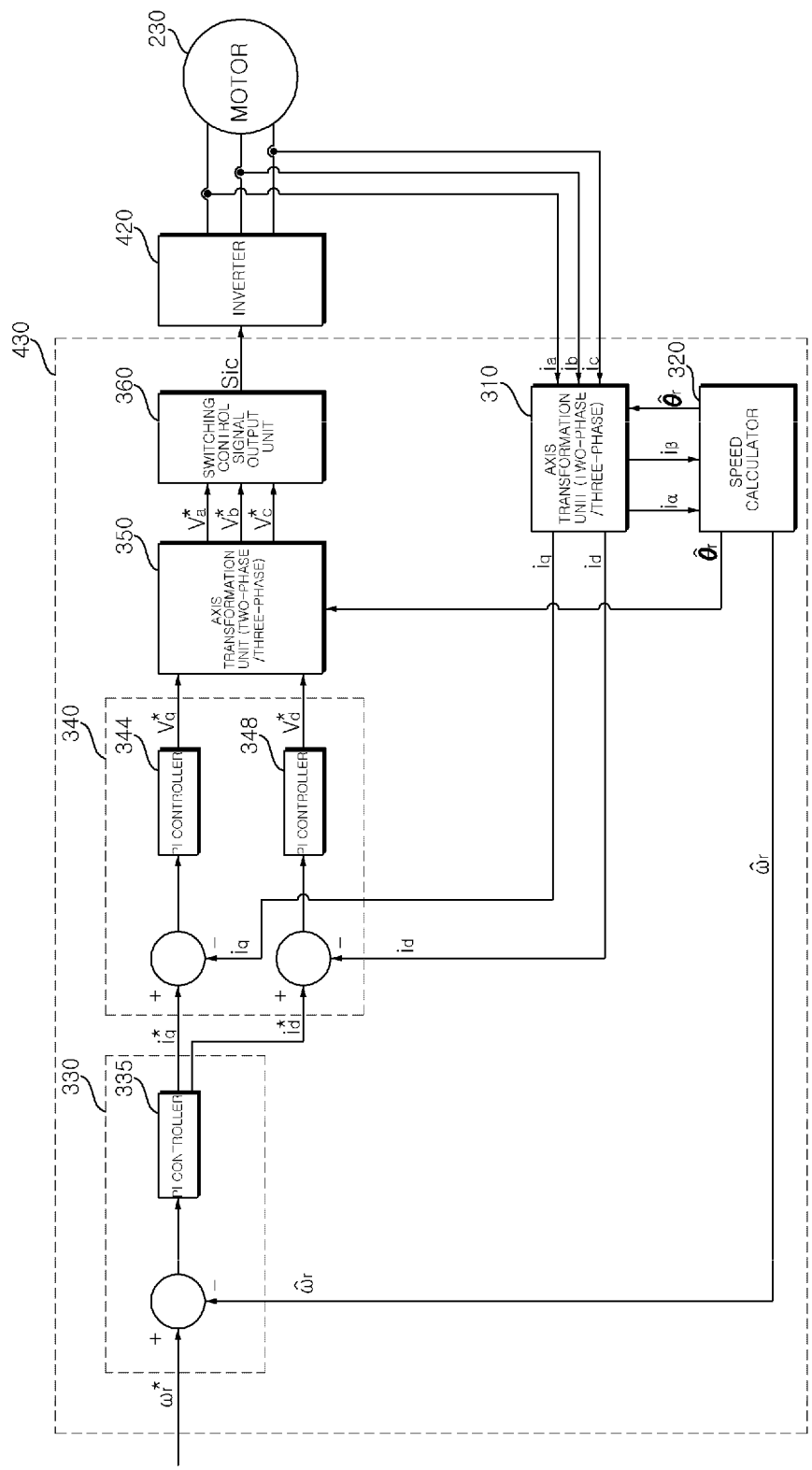
FIG. 6 is an internal block diagram illustrating an inverter controller of FIG. 5.

FIG. 6 is an internal block diagram illustrating an inverter controller of FIG. 5.

Referring to FIG. 6, the inverter controller 430 may include an axis transformation unit 310, a speed calculator 320, a current reference generator 330, a voltage reference generator 340, an axis transformation unit 350, and a switching control signal output unit 360.

The axis transformation unit 310 receives the three-phase output currents $i_a$, $i_b$, and $i_c$ detected by the output current detector E and transforms the received output currents $i_a$, $i_b$, and $i_c$ into two-phase currents $i_\alpha$ and $i_\beta$ of a stationary coordinate system.

Meanwhile, the axis transformation unit 310 may transform the two-phase currents $i_\alpha$ and $i_\beta$ of the stationary coordinate system into two-phase currents $i_d$ and $i_q$ of a rotating coordinate system.

The speed calculator 320 may output a calculated position $\hat{\theta}$, and a calculated speed $\hat{\omega}$, based on the two-phase currents $i_\alpha$ and $i_\beta$ of the stationary coordinate system which is transformed by the axis transformation unit 310.

Meanwhile, the current reference generator 530 generates a current reference value $i^*_q$ based on the calculated speed $\hat{\omega}_r$ and a speed reference value $\omega^*_r$. For example, a PI controller 335 of the current reference generator 330 may perform PI control based on a difference between the calculated speed $\hat{\omega}_r$ and the speed reference value $\omega^*_r$, and may generate a current reference value $i^*_q$. Although a q-axis current reference value $i^*_q$ is shown as the current reference value in the figure, it is possible to generate a d-axis current reference value $i^*_d$ together with the q-axis current reference value $i^*_q$. The d-axis current reference value $i_d$ may be set to 0.

Meanwhile, the current reference generator 330 may further include a limiter (not shown) for limiting the level of the current reference value $i^*_q$ such that the current reference value $i^*_q$ does not exceed an allowable range.

The voltage reference generator 340 generates d-axis and q-axis voltage reference values $V^*_d$ and $V^*_q$ based on d-axis and q-axis currents $i_d$ and $i_q$ axis-transformed into a two-phase rotating coordinate system by the axis transformation unit and the current reference value $i^*_d$ and $i^*_q$ generated by the current reference generator 330. For example, a PI controller 344 of the voltage reference generator 340 may perform PI control based on the difference between the q-axis current $i_q$ and the q-axis current reference value $i^*_q$ to generate a q-axis voltage reference value $V^*_q$. In addition, a PI controller 348 of the voltage reference generator 340 may perform PI control based on the difference between the d-axis current $i_d$ and the d-axis current reference value $i^*_d$ to generate a d-axis voltage reference value $V^*_d$. The d-axis voltage reference value $V^*_d$ may be set to 0 in the case in which the d-axis current reference value $i^*_d$ is set to 0.

Meanwhile, the voltage reference generator 340 may further include a limiter (not shown) for limiting levels of the d-axis and q-axis voltage reference values $V^*_d$ and $V^*_q$ such that the d-axis and q-axis voltage reference values $V^*_d$ and $V^*_q$ do not exceed allowable ranges.

Meanwhile, the generated d-axis and q-axis voltage reference values $V^*_d$ and $V^*_q$ are input to the axis transformation unit 350.

The axis transformation unit 350 receives the calculated position $\hat{\theta}_r$ and the d-axis and q-axis voltage reference values $V^*_d$ and $V^*_q$ from the position estimator 320 to perform axis transformation.

First, the axis transformation unit 350 performs transformation from a two-phase rotating coordinate system to a two-phase stationary coordinate system. At this time, the position $\hat{\theta}_r$ calculated by the position estimator 320 may be used.

Subsequently, the axis transformation unit 350 performs transformation from the two-phase stationary coordinate system to a three-phase stationary coordinate system. As a result, the axis transformation unit 350 outputs three-phase output voltage reference values V*a, V*b, and V*c.

The switching control signal output unit 360 generates and outputs a PWM-based inverter switching control signal $S_{ic}$ based on the three-phase output voltage reference values V*a, V*b, and V*c.

The output inverter switching control signal $S_{ic}$ may be converted into a gate driving signal by a gate driver (not shown), and may then be input to a gate of each switching element of the inverter 420. As a result, the respective switching elements Sa, S'a, Sb, S'b, Sc, and S'c of the inverter 420 perform switching operations.

As described above, it is essential for the motor driving apparatus 220 to sense an output current io flowing to the motor, particularly a phase current, in order to perform vector control for driving the motor 230 through control of the inverter 420.

The inverter controller 430 may control the motor 230 to produce a desired speed and a desired torque using the current reference generator 330 and the voltage reference generator 340 based on the sensed phase current.

Figure 7:
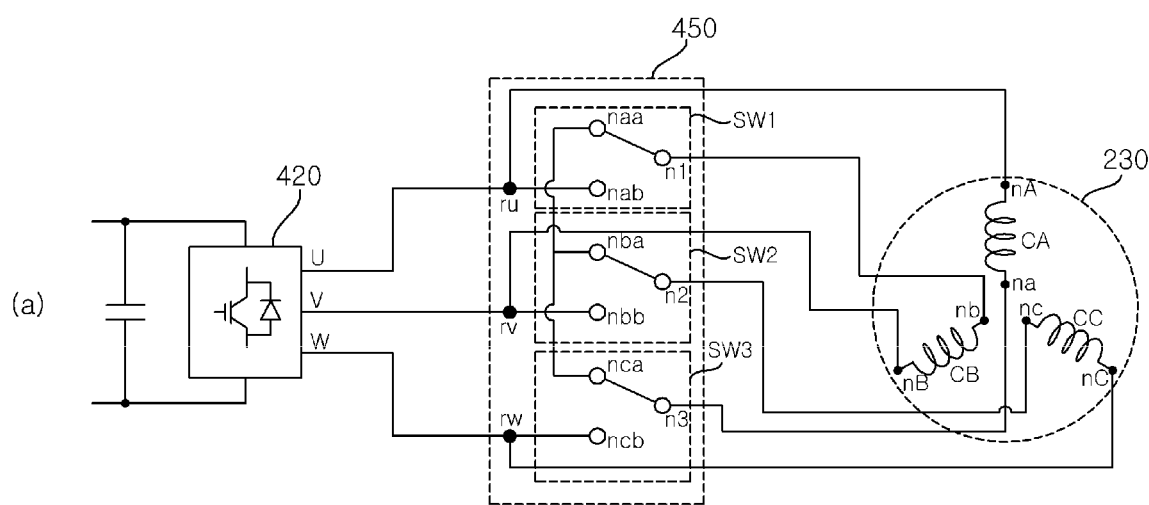
FIG. 7 is a diagram referred to in the description of an operation of a switching device of FIG. 4.
Figure 7:
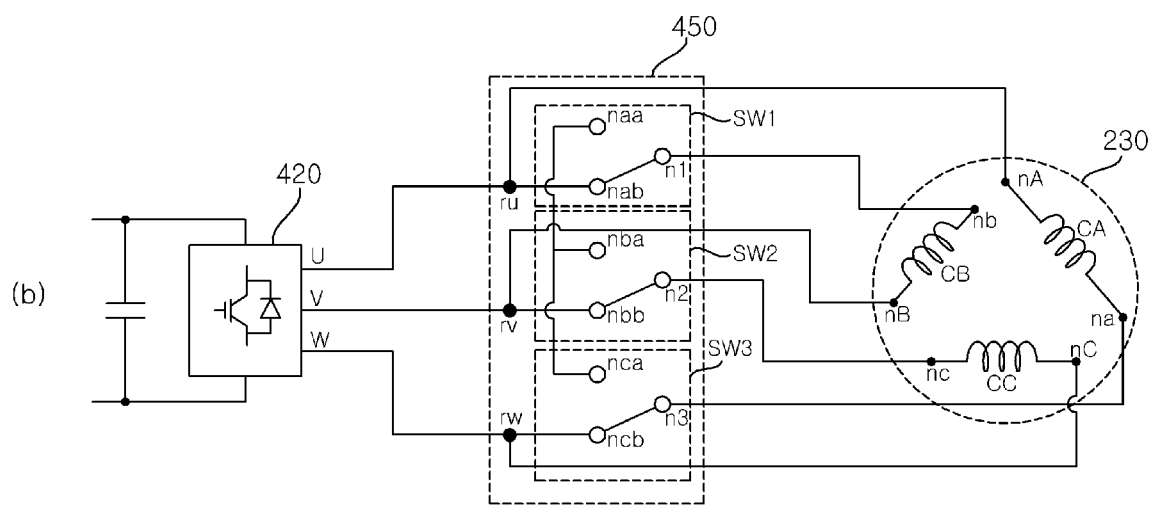

FIG. 7 is a diagram referred to in the description of an operation of a switching device of FIG. 4.

Referring to the drawing, (a) of FIG. 7 illustrates an example in which the switching device 450 operates such that the motor 230 operates in Y-connection which is the first connection; and (b) of FIG. 7 illustrates an example in which the switching device 450 operates such that the motor 230 operates in Δ-connection which is the second connection.

The switching device 450 includes the first to third relay devices SW1 to SW3 which are electrically connected to the respective phase outputs of the inverter 420.

A first terminal naa of the first relay device SW1, a first terminal nba of the second relay device SW2, and a first terminal nca of the third relay device SW3 are connected in parallel, in which one end nA of a first winding CA of the motor 230 is connected to the second terminal nab of the first relay device SW1; one end nB of a second winding CB of the motor 230 is connected to the second terminal nbb of the second relay device SW2; one end nC of a third winding CC of the motor 230 is connected to the second terminal ncb of the third relay device SW3; the other end na of the first winding CA of the motor 230 is connected to a common terminal n3 of the third relay device SW3; the other end nb of the second winding CB of the motor 230 is connected to a common terminal n1 of the first relay device SW1; and the other end nc of the third winding CC of the motor 230 is connected to the common terminal n2 of the second relay device SW2.

The second terminal nab of the first relay device SW1 is connected to a U-phase output terminal ru of the inverter 420, and the second terminal nbb of the second relay device SW2 is connected to a V-phase output terminal rv of the inverter 420, and the second terminal ncb of the third relay device SW3 is connected to a W-phase output terminal rw of the inverter 420.

As illustrated in (a) of FIG. 7, for the first connection, the controller 170 may control the common terminals n1, n2, and n3 of the first to third relay devices SW1 to SW3 to be electrically connected to the respective first terminals naa, nba, and nca of the first to third relay devices SW1 to SW3.

In this manner, output currents of the U-, V-, and W-phases of the inverter 420 may respectively flow through the a-phase coil CA, the b-phase coil CB, and the c-phase coil CC of the motor 230 which is in Y-connection.

As illustrated in (b) of FIG. 7, for the second connection, the controller 170 may control the common terminals n1, n2, and n3 of the first to third relay devices SW1 to SW3 to be electrically connected to the respective second terminals nab, nbb, and ncb of the first to third relay devices SW1 to SW3.

In this manner, output currents of the U-, V-, and W-phases of the inverter 420 may respectively flow through the b-phase coil CB, the c-phase coil CC, and the a-phase coil CA of the motor 230 which is in Δ-connection.

As a result, by the switching device 450, it is possible to control the motor 230 to operate in the first connection or the second connection, thereby increasing power conversion efficiency or driving efficiency of the motor 230.

Figure 8A:
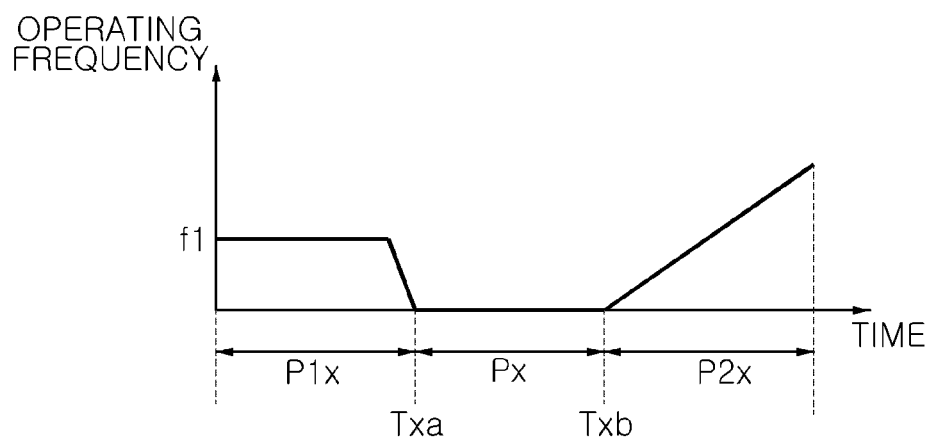
FIGS. 8A and 8B are timing diagrams illustrating a winding switching operation of the switching device of FIG. 7.
Figure 8B:
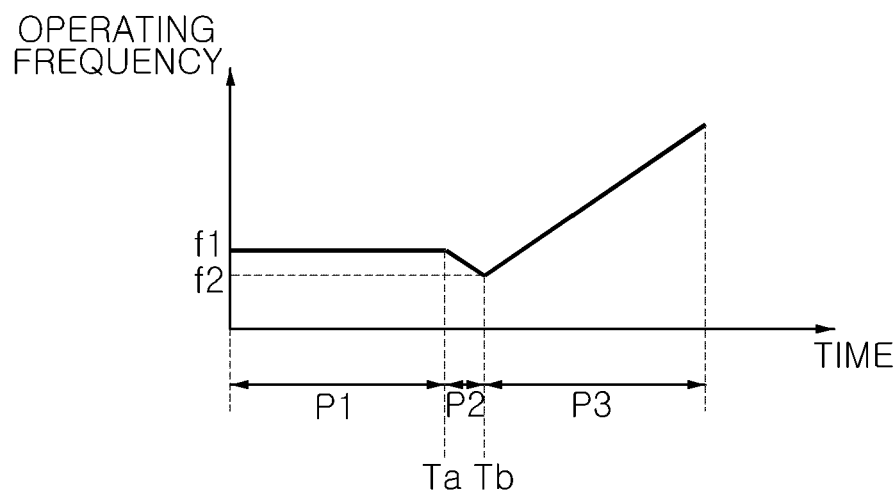

FIGS. 8A and 8B are timing diagrams illustrating a winding switching operation of the switching device of FIG. 7.

First, FIG. 8A is a timing diagram illustrating an example of a winding switching operation of the switching device of FIG. 7.

Referring to the drawing, when an operating frequency of the motor 230 is less than f1, the switching device 450 may operate for the motor 230 to be in Y-connection as illustrated in (a) of FIG. 7.

In the drawing, an example is illustrated in which during a period Pix up to a time point Txa, the switching device 450 operates for the motor 230 to be in Y-connection.

Then, during a period Px from Txa to Txb, the motor 230 may be stopped.

Subsequently, during a period P2x after the time point Txb, the switching device 450 may operate for the motor 230 to be in Δ-connection as illustrated in (b) of FIG. 7.

For example, if an operating frequency of the motor 230 exceeds f1, the switching device 450 may operate for the motor 230 to be in Δ-connection; and during the period Px, the motor 230 may be stopped for Y to Δ conversion.

Next, FIG. 8B is a timing diagram illustrating another example of a winding switching operation of the switching device.

Referring to the drawing, when an operating frequency of the motor 230 is less than or equal to f1, the switching device 450 may operate for the motor 230 to be in Y-connection.

In the drawing, an example is illustrated in which during a period P1 up to a time point Ta, the switching device 450 operates for the motor 230 to be in Y-connection.

Then, during a period P2 from Ta to Tb, the controller 170 or the inverter controller 430 may control windings of the motor 230 to be switched from the first connection to the second connection.

Particularly, the controller 170 or the inverter controller 430 may control the motor 230 not to stop during the period P2, and may control an operating frequency of the motor 230 to temporarily decrease from the first frequency f1 to the second frequency f2.

Subsequently, during a period P3 after the time period Tb, the switching device 450 may operate for the motor 230 to be in Δ-connection as illustrated in (b) of FIG. 7.

For example, if an operating frequency of the motor 230 exceeds f1, the controller 170 or the inverter controller 430 may control the switching device 450 to operate for the motor 230 to be in Δ-connection.

Specifically, during the period P3, the controller 170 or the inverter controller 430 may control the operating frequency of the motor 230, which is temporarily decreased to the second frequency f2, to increase again.

The controller 170 of the inverter controller 430 may control the motor 230 to operate continuously without stopping while the switching device 450 switches the windings of the motor 230 from the first connection to the second connection. In this manner, the motor 230 does not stop during the switching operation of the switching device 450, such that an operating efficiency of the motor 230 may be improved.

In this case, the period P2 of FIG. 8B is preferably shorter than the period Px of FIG. 8A. Accordingly, by temporarily decreasing the speed of the motor 230, the windings of the motor 230 may be switched from the first connection to the second connection.

FIGS. 9A to 9I are diagrams referred to in the description of a switching device of FIG. 4.

Figure 9A:
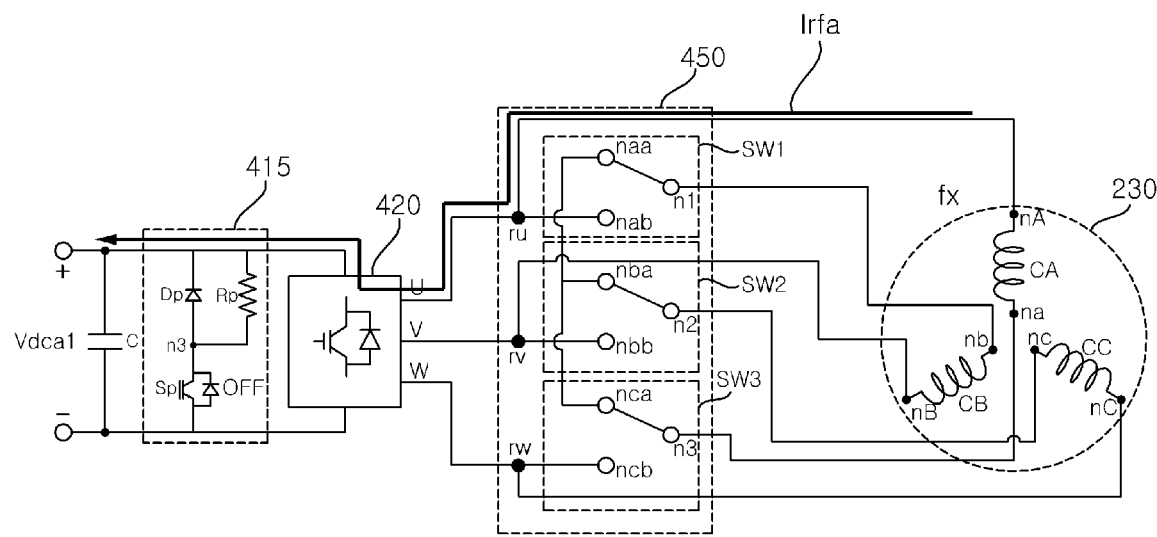
FIGS. 9A to 9I are diagrams referred to in the description of a switching device of FIG. 4.

First, FIG. 9A illustrates an example in which the motor 230 is in the first connection, and an operating frequency of the motor 230 is fx.

Referring to the drawing, when the windings of the motor 230 are connected in the first connection, and the operating frequency of the motor 230 is fx, if an output of the inverter 420 is stopped or decreased for switching to the second connection, a regenerative current Irfa may pass through the switching device 450 and the inverter 420 to flow to the DC terminal capacitor C.

Accordingly, a dc terminal voltage, which is a voltage at both ends of the DC terminal capacitor C, may increase to Vdca1.

However, the regenerative current Irfa may increase the possibility of burnout of the DC terminal. Further, the regenerative current Irfa may also increase the possibility of burnout of the switching device 450, the inverter 420, and the like.

Particularly, as the operating frequency of the motor 230 increases, the possibility of burnout of the DC terminal capacitor C, the switching device 450, the inverter 420, and the like may also increase.

In order to reduce the possibility of burnout of the circuit device, a brake chopper circuit 415 operates when a dc terminal voltage exceeds an allowable voltage.

Figure 9B:
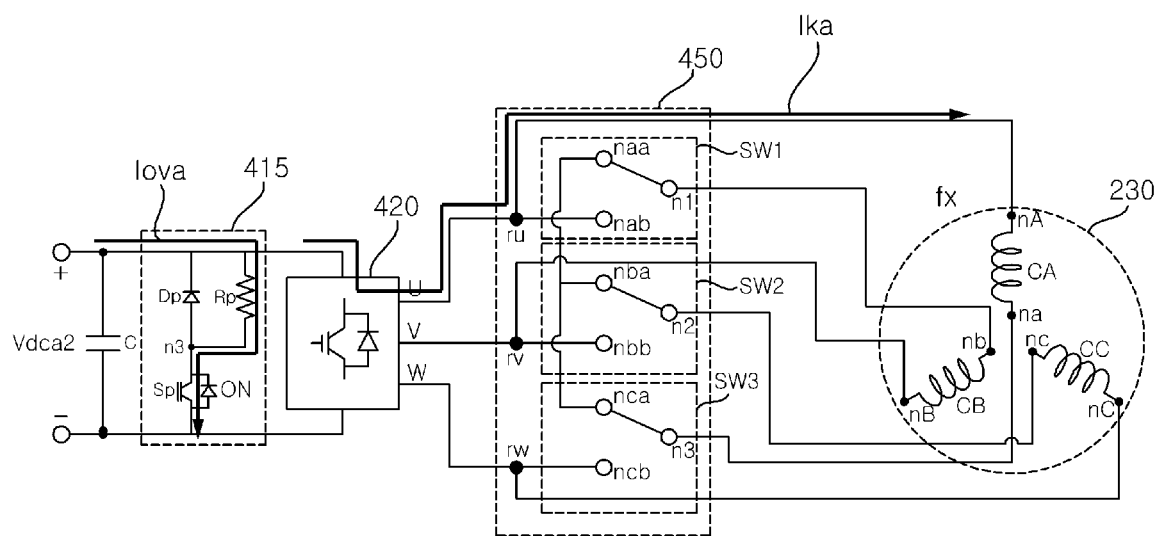

FIG. 9B illustrates an example in which the brake chopper circuit 415 operates when the windings of the motor 230 are connected in the first connection, and the operating frequency of the motor is fx.

For example, if a dc terminal voltage Vdca1 of FIG. 9A exceeds an allowable voltage, the switching element Sp in the brake chopper circuit 415 is switched from an OFF state to an ON state, and as the switching element Sp is turned on, a portion Iova of the current from the DC terminal capacitor C flows through the switching element Sp and the resistor element Rp in the brake chopper circuit 415.

Accordingly, the dc terminal voltage may decrease to a voltage Vdca2 which is lower than Vdca1 of FIG. 9A.

As the switching element Sp is turned on, another portion Ika of the current from the DC terminal capacitor C flows to the inverter 420 and the switching device 450. Due to the current Ika, the possibility of burnout of the switching device 450 may increase.

Accordingly, the present disclosure provides a method of reducing the possibility of burnout of the switching device 450 by the flow of the regenerative current or a portion of the dc terminal current. Particularly, the present disclosure provides a method of controlling the regenerative current not to occur or a level of the regenerative current to decrease during switching of connection by the switching device 450 for the dc terminal voltage not to exceed an allowable voltage.

Figure 9C:
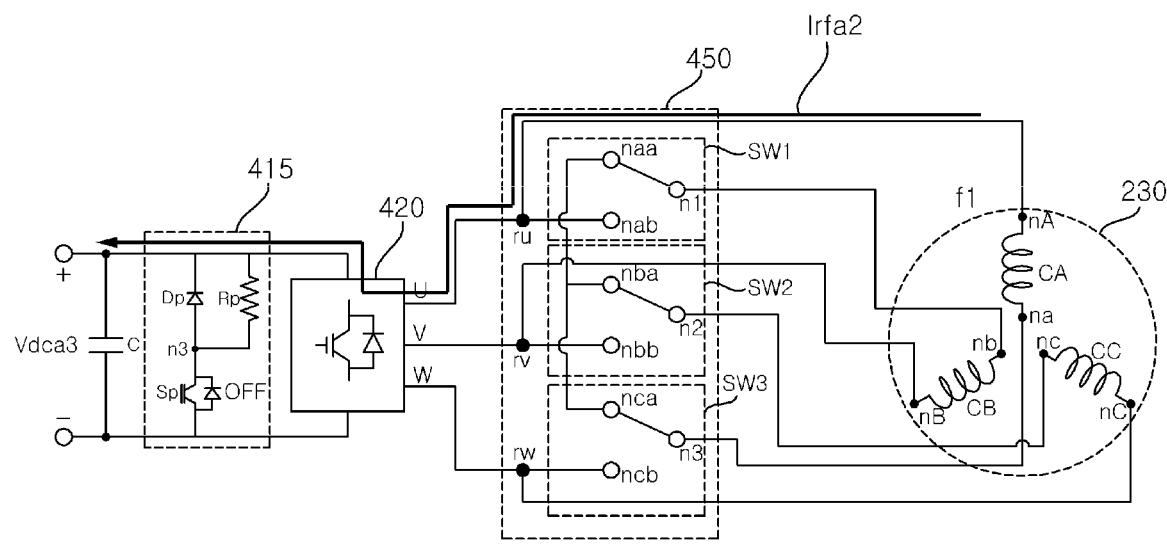

FIG. 9C illustrates an example in which windings of the motor 230 are connected in the first connection, and the operating frequency of the motor 230 is f1 which is less than fx.

Referring to the drawing, when the windings of the motor 230 are switched from the first connection to the second connection, the controller 170 or the inverter controller 430 may control the operating frequency of the motor 230 to be f1 which is less than fx.

Accordingly, a regenerative current at a level lower than Irfa of FIG. 9A may flow to the DC terminal capacitor C through the switching device 450 and the inverter 420.

Meanwhile, a dc terminal voltage, which is a voltage at both ends of the DC terminal capacitor C, may be Vdca3 which is less than Vdca1 of FIG. 9A. In this case, Vdca3 is preferably less than or equal to an allowable voltage.

Accordingly, the brake chopper circuit 415 at the dc terminal does not operate during the operation of the switching device 450.

By the regenerative current Irfa2, the possibility of burnout of the DC terminal capacitor C may be reduced significantly, as well as the possibility of burnout of the switching device 450, the inverter 420, and the like.

That is, the controller 170 or the inverter controller 430 according to the embodiment of the present disclosure may control the operating frequency of the motor 230 to be less than or equal to the first frequency f1 when the motor 230 is switched from the first connection to the second connection. In this manner, burnout of the switching device 450 for switching connection of windings of the motor 230 may be prevented, as well as burnout of the inverter 420.

Figure 9D:
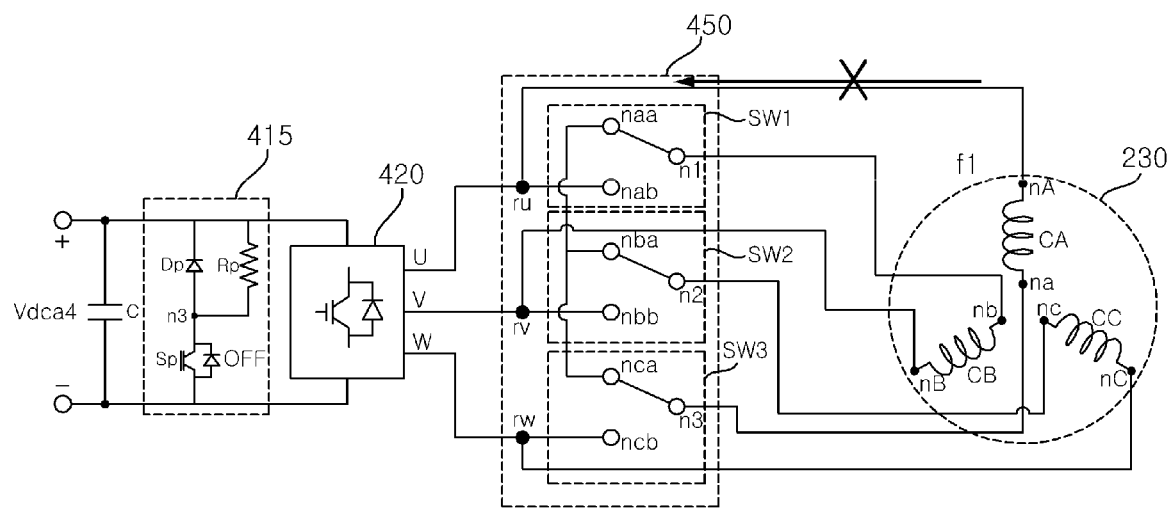

Similarly to FIG. 9C, FIG. 9D illustrates an example in which the windings of the motor 230 are connected in the first connection, and the operating frequency of the motor 230 is f1 which is less than fx.

Referring to the drawing, when the windings of the motor 230 are switched from the first connection to the second connection, the controller 170 or the inverter controller 430 may control the operating frequency of the motor 230 to be f1 which is less than fx.

Meanwhile, there is a difference in that unlike FIG. 9C, no regenerative current flows in FIG. 9D.

Accordingly, the dc terminal voltage, which is a voltage at both ends of the DC terminal capacitor C, may be Vdca4 which is less than Vdca3.

In this case, Vdca4 is less than or equal to an allowable voltage, such that the brake chopper circuit 415 at the dc terminal does not operate during the operation of the switching device 450.

As a result, the possibility of burnout of the switching device 450, the inverter 420, and the like may be reduced significantly.

Figure 9E:
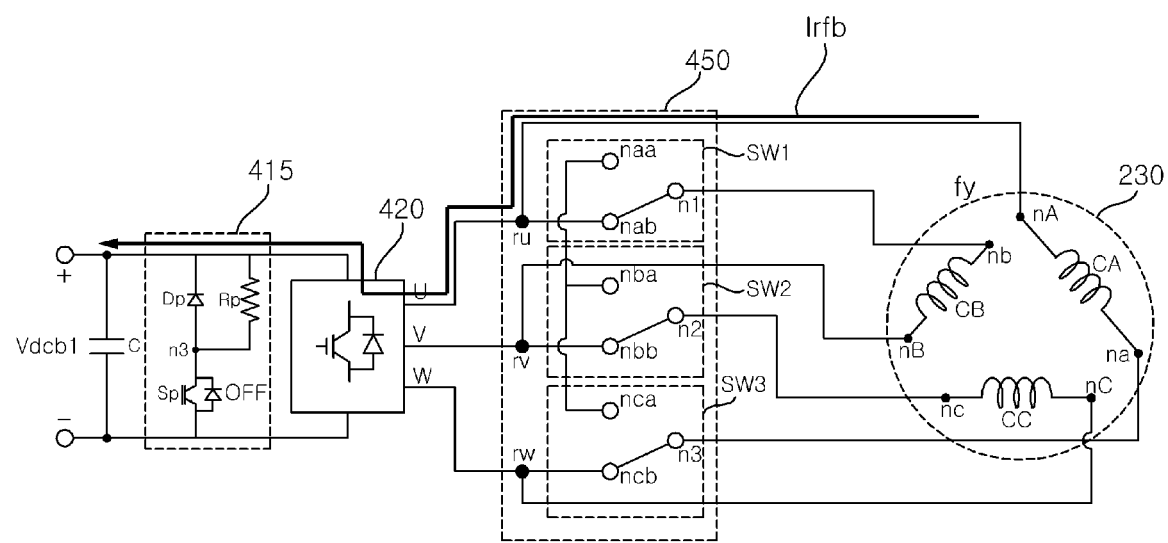

Then, FIG. 9E illustrates an example in which the windings of the motor 230 are connected in the second connection, and the operating frequency of the motor 230 is fy.

Referring to the drawing, when the windings of the motor 230 are connected in the second connection, and the operating frequency of the motor 230 is fy, if an output of the inverter 420 is stopped or decreased for switching to the first connection, a regenerative current Irfb may flow to the DC terminal capacitor C through the switching device 450 and the inverter 420.

Accordingly, the dc terminal voltage, which is a voltage at both ends of the DC terminal capacitor C, may increase to Vdcb1.

In this case, the regenerative current Irfb may increase the possibility of burnout of the DC terminal capacitor C. Further, the regenerative current Irfb may also increase the possibility of burnout of the switching device 450, the inverter 420, and the like.

Particularly, as the operating frequency of the motor 230 increases, the possibility of burnout of the DC terminal capacitor C, the switching device 450, the inverter 420, and the like may also increase.

In order to reduce the possibility of burnout of the circuit device, the brake chopper circuit 415 operates if a dc terminal voltage exceeds an allowable voltage.

Figure 9F:
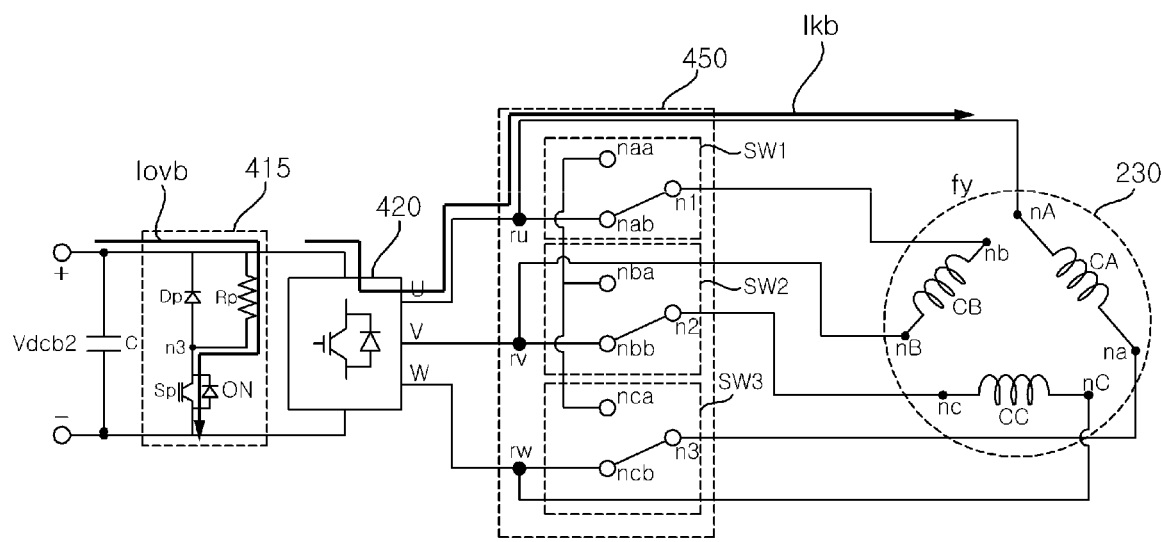

FIG. 9F illustrates an example in which the brake chopper circuit 415 operates when the windings of the motor 230 are connected in the second connection, and the operating frequency of the motor is fy.

For example, if a dc terminal voltage Vdcb1 of FIG. 9E exceeds an allowable voltage, the switching element Sp in the brake chopper circuit 415 is switched from an OFF state to an ON state, and as the switching element Sp is turned on, a portion Iovb of the current from the DC terminal capacitor C flows through the switching element Sp and the resistor element Rp in the brake chopper circuit 415.

In this manner, the dc terminal voltage may decrease to a voltage Vdcb2 which is less than Vdcb1 of FIG. 9E.

As the switching element Sp is turned on, another portion Ikb of the current from the DC terminal capacitor C flows to the inverter 420 and the switching device 450. Due to the current Ikb, the possibility of burnout of the switching device 450 may increase.

Accordingly, the present disclosure provides a method of reducing the possibility of burnout of the switching device 450 by the flow of the regenerative current or a portion of the dc terminal current of FIGS. 9E and 9F. Particularly, the present disclosure provides a method of controlling the regenerative current not to occur or a level of the regenerative current to decrease during switching of connection by the switching device 450, so that the dc terminal voltage does not exceed an allowable voltage.

Figure 9G:
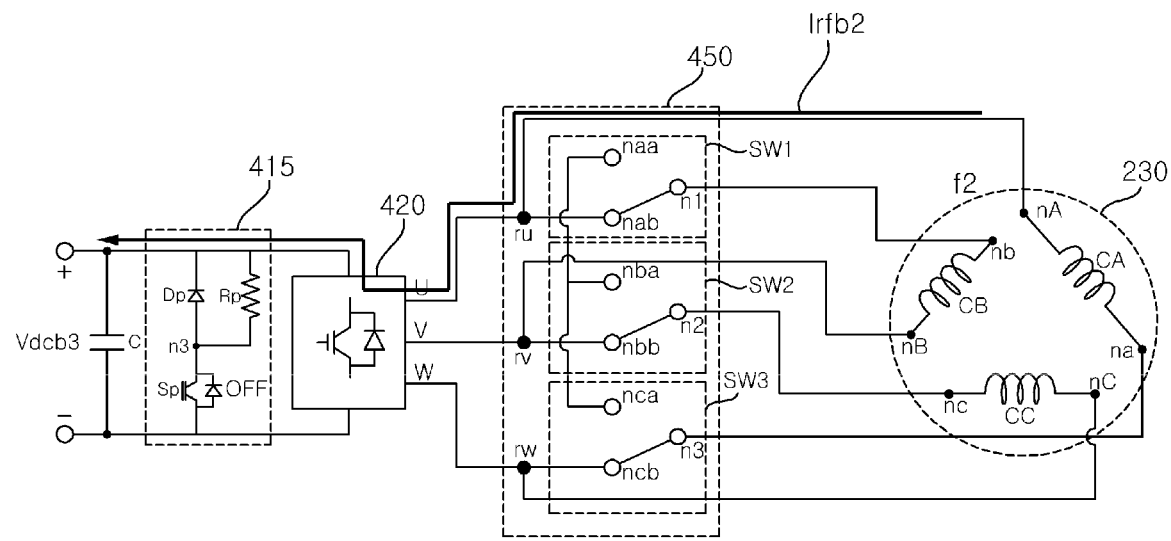

FIG. 9G illustrates an example in which the windings of the motor 230 are connected in the second connection, and the operating frequency of the motor 230 is f2 which is less than fy.

Referring to the drawing, when the windings of the motor 230 are switched from the second connection to the first connection, the controller 170 or the inverter controller 430 may control the operating frequency of the motor 230 to be f2 which is less than fy.

Accordingly, a regenerative current Irfb2 at a level lower than Irfb of FIG. 9E may flow to the DC terminal capacitor C through the switching device 450 and the inverter 420.

Meanwhile, a dc terminal voltage, which is a voltage at both ends of the DC terminal capacitor C, may be Vdca3 which is less than Vdcb1 of FIG. 9E. In this case, Vdca3 is preferably less than or equal to an allowable voltage.

Accordingly, the brake chopper circuit 415 at the dc terminal does not operate during the operation of the switching device 450.

By the regenerative current Irfb2, the possibility of burnout of the DC terminal capacitor C may be reduced significantly, as well as the possibility of damage to the switching device 450, the inverter 420, and the like.

Meanwhile, in the first connection which is Y-connection, an induced voltage or a counter electromotive force is approximately $\sqrt{3}$ times greater than in the second connection which is Δ connection, such that a maximum operating frequency of the motor 230 in the first connection is preferably greater than a maximum operating frequency of the motor 230 in the second connection.

Accordingly, during switching from the second connection to the first connection, the controller 170 or the inverter controller 430 preferably controls the operating frequency of the motor 230 to be less than or equal to the second frequency f2 which is less than the first frequency f1.

Accordingly, burnout of the switching device 450 for switching connection of windings of the motor 230 may be prevented, as well as burnout of the inverter 420.

Figure 9H:
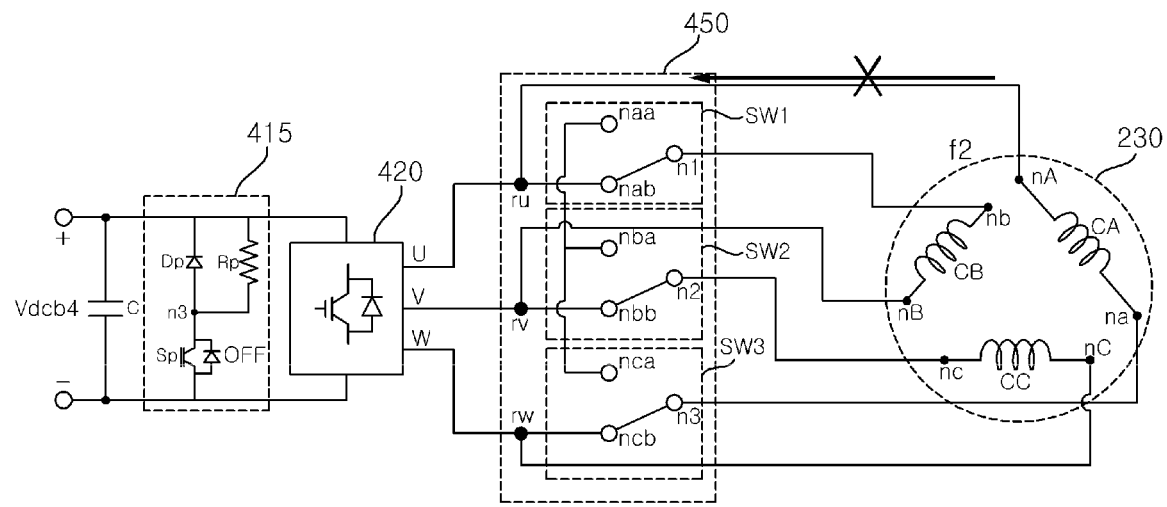

Similarly to FIG. 9G, FIG. 9H illustrates an example in which the windings of the motor 230 are connected in the second connection, and the operating frequency of the motor 230 is f2 which is less than fy.

Referring to the drawing, when the windings of the motor 230 are switched from the second connection to the first connection, the controller 170 or the inverter controller 430 may control the operating frequency of the motor 230 to be f2 which is less than fy.

Meanwhile, there is a difference in that unlike FIG. 9G, no regenerative current flows in FIG. 9H.

Accordingly, the dc terminal voltage, which is a voltage at both ends of the DC terminal capacitor C, is Vdcb4 which is less than Vdcb3 of FIG. 9G.

In this case, Vdcb4 is less than or equal to an allowable voltage, such that the brake chopper circuit 415 at the dc terminal does not operate during the operation of the switching device 450.

As a result, the possibility of burnout of the switching device 450, the inverter 420, and the like may be reduced significantly.

Figure 9I:
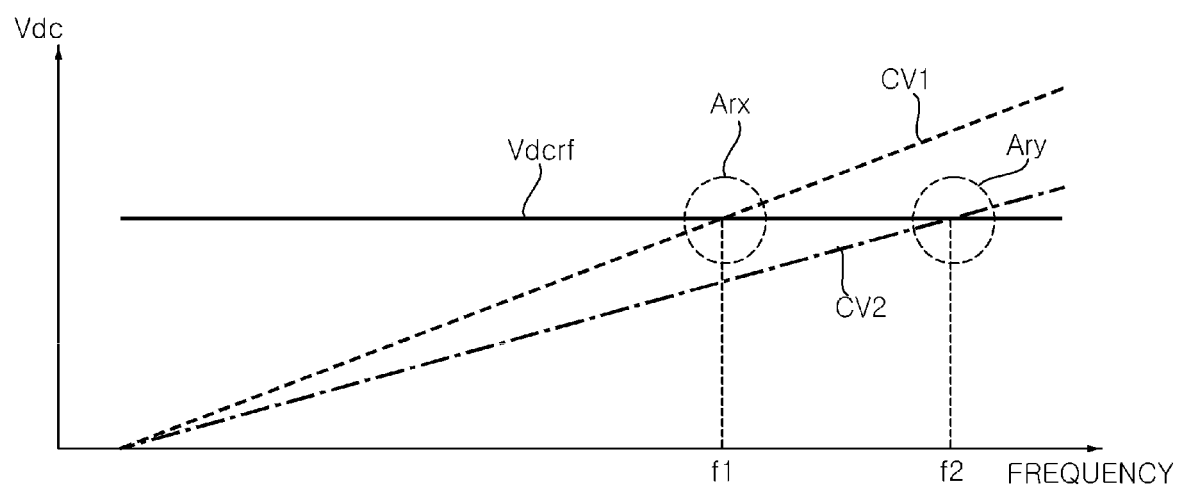

FIG. 9I illustrates a graph CV1 showing a dc terminal voltage change with respect to frequency in the first connection, and a graph CV2 showing a dc terminal voltage change with respect to frequency in the first connection.

Referring to the drawing, as the operating frequency of the motor increases, an increasing rate of the dc terminal voltage in the first connection is greater than an increasing rate of the dc terminal voltage in the second connection.

Meanwhile, Vdcf in the drawing may indicate an allowable voltage of the dc voltage, in which Vdcf may be approximately in a range of 700 V to 800 V.

Meanwhile, as the increasing rate of the dc terminal voltage in the first connection is greater than the increasing rate of the dc terminal voltage in the second connection, if the dc terminal voltage, such as Arx, in the first connection exceeds the allowable voltage Vdcf, the possibility of burnout of the switching device 450 and the like may increase due to the regenerative current or the dc terminal current.

Accordingly, in the present disclosure, during switching from the first connection to the second connection by the operation of the switching device 450, the motor 230 is controlled to operate with the dc terminal voltage at a frequency less than or equal to the first frequency f1 which is a maximum frequency not exceeding the allowable voltage Vdcf.

Similarly, in the present disclosure, during switching from the second connection to the first connection by the operation of the switching device 450, the motor 230 is controlled to operate with the dc terminal voltage at a frequency less than or equal to a second frequency f2 which is a maximum frequency not exceeding the allowable voltage Vdcf, which will be described below with reference to FIG. 10.

Figure 10:
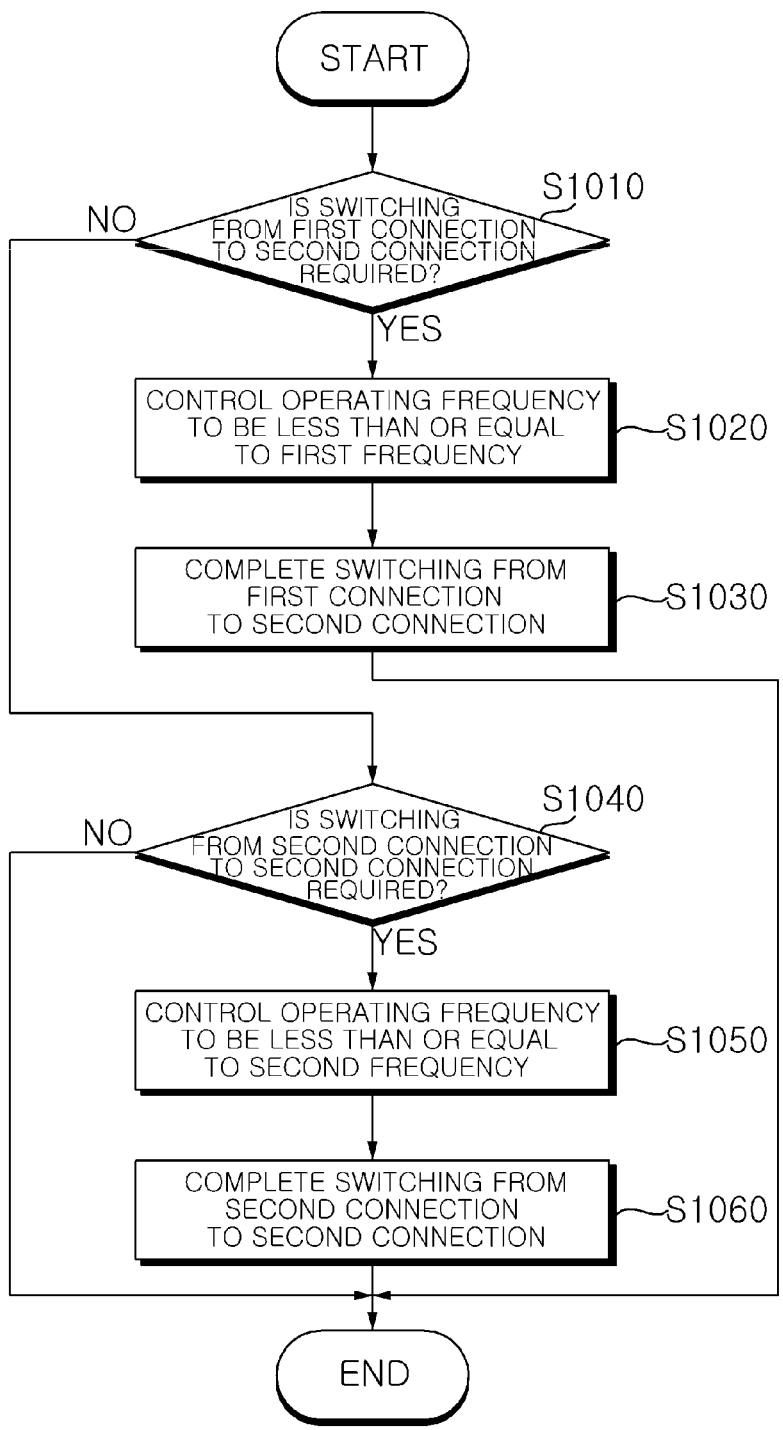
FIG. 10 is a flowchart illustrating an operating method of a motor driving apparatus according to an embodiment of the present disclosure.

FIG. 10 is a flowchart illustrating an operating method of a motor driving apparatus according to an embodiment of the present disclosure.

Referring to the drawing, the controller 170 or the inverter controller 430 determines whether switching from the first connection to the second connection is required (S1010).

For example, is the motor 230 is required to operate at a speed exceeding the first speed, the controller 170 or the inverter controller 430 may determine that switching from the first connection to the second connection is required.

Accordingly, as illustrated in FIG. 9C or 9D, the controller 170 or the inverter controller 430 may control the operating frequency of the motor 230 to be less than or equal to the first frequency f1 (S1020).

In this manner, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control the operating frequency of the motor 230 to be less than or equal to the first frequency f1 so that the detected dc terminal voltage Vdc may be less than or equal to an allowable voltage, as illustrated in FIG. 9C or 9D. Accordingly, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control an output of the inverter 420 to be stopped as illustrated in FIG. 9C or 9D. After the output of the inverter 420 is stopped, a regenerative current from the motor 230 is supplied to the dc terminal through the switching device 450 and the inverter 420. The controller 170 or the inverter controller 430 may control control the operating frequency of the motor 230 to be less than or equal to the first frequency f1 during the supply of the regenerative current for the detected dc terminal voltage Vdc to be less than or equal to the allowable voltage. Accordingly, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control the operating frequency of the motor 230 to decrease to the first frequency f1 or less as illustrated in FIG. 9C or 9D so that the switching element Sp in the brake chopper circuit 415 may not be turned on. Accordingly, it is possible to control the brake chopper circuit 415 at the dc terminal not to operate during the operation of the switching device 450, thereby preventing burnout of the switching device 450 for switching connection of windings of the motor 230.

Meanwhile, if the windings of the motor 230 are switched from the first connection to the second connection, the controller 170 or the inverter controller 430 may control an output of the inverter 420 to be stopped as illustrated in FIG. 9C or 9D. After the output of the inverter 420 is stopped, the controller 170 or the inverter controller 430 may control a first regenerative current from the motor 230 to be supplied to the dc terminal, and then a second regenerative current, which is lower than the first regenerative current, to be supplied to the dc terminal for the switching element Sp in the brake chopper circuit 415 not to be turned on. In this manner, it is possible to control the brake chopper circuit 415 not to operate during the operation of the switching device 450. As a result, burnout of the switching device 450 for switching connection of windings of the motor 230 may be prevented.

Then, the controller 170 or the inverter controller 430 may complete switching from the first connection to the second connection (S1030). That is, the controller 170 or the inverter controller 430 may control switching from (a) to (b) of FIG. 7.

Meanwhile, the controller 170 or the inverter controller 430 determines whether switching from the second connection to the first connection is required (S1040).

For example, if the motor 230 is required to operate at a speed less than or equal to the first speed, the controller 170 or the inverter controller 430 may determine that switching from the second connection to the first connection is required.

Accordingly, the controller 170 or the inverter controller 430 may control the operating frequency of the motor 230 to be less than or equal to a second frequency f2 which is less than the first frequency f1 (S1050).

In this manner, burnout of the switching device 450 for switching connection of windings of the motor 230 may be prevented, as well as burnout of the inverter 420.

Meanwhile, if the windings of the motor 230 are switched from the second connection to the first connection, the controller 170 or the inverter controller 430 may control the operating frequency of the motor 230 to be less than or equal to the second frequency f2 as illustrated in FIG. 9G or 9H, so that the detected dc terminal voltage Vdc is less than or equal to the allowable voltage. In this manner, burnout of the switching device 450 for switching connection of windings of the motor 230 may be prevented, as well as burnout of the inverter 420.

Meanwhile, if the windings of the motor 230 are switched from the second connection to the first connection, the controller 170 or the inverter controller 430 may control an output of the inverter 420 to be stopped as illustrated in FIG. 9G or 9H. After the output of the inverter 420 is stopped, a regenerative current from the motor 230 is supplied to the dc terminal through the switching device 450 and the inverter 420. The controller 170 or the inverter controller 430 may control the operating frequency of the motor 230 to be less than or equal to the second frequency f2 during the supply of the regenerative current for the detected dc terminal voltage Vdc to be less than or equal to the allowable voltage. In this manner, burnout of the switching device 450 for switching connection of windings of the motor 230 may be prevented, as well as burnout of the inverter 420.

Meanwhile, if the windings of the motor 230 are switched from the second connection to the first connection, the controller 170 or the inverter controller 430 may control the operating frequency of the motor 230 to decrease to the second frequency f2 or less as illustrated in FIG. 9G or 9H so that the switching element Sp in the brake chopper circuit 415 may not be turned on. Accordingly, it is possible to control the brake chopper circuit 415 at the dc terminal not to operate during the operation of the switching device 450. As a result, burnout of the switching device 450 for switching connection of windings of the motor 230 may be prevented.

Meanwhile, if the windings of the motor 230 are switched from the second connection to the first connection, the controller 170 or the inverter controller 430 may control an output of the inverter 420 to be stopped as illustrated in FIG. 9G or 9H. After the output of the inverter 420 is stopped, the controller 170 or the inverter controller 430 may control a third regenerative current from the motor 230 to be supplied to the dc terminal, and then a fourth regenerative current, which is lower than the third regenerative current, to be supplied to the dc terminal for the switching element Sp in the brake chopper circuit 415 not to be turned on. In this manner, it is possible to control the brake chopper circuit 415 not to operate during the operation of the switching device 450. As a result, burnout of the switching device 450 for switching connection of windings of the motor 230 may be prevented.

Then, the controller 170 or the inverter controller 430 may complete switching from the second connection to the first connection (S1060). That is, the controller 170 or the inverter controller 430 may control switching from (b) to (a) of FIG. 7.

Meanwhile, if the windings of the motor 230 are switched from the first connection to the second connection, the controller 170 or the inverter controller 430 may control the operating frequency of the motor 230 to be greater than or equal to a first reference frequency, and if the windings of the motor 230 are switched from the second connection to the first connection, the controller 170 or the inverter controller 430 may control the operating frequency of the motor 230 to be greater than or equal to a second reference frequency.

That is, if the windings of the motor 230 are switched from the first connection to the second connection, the controller 170 or the inverter controller 430 may control a minimum operating frequency of the motor 230 to be the first reference frequency, and if the windings of the motor 230 are switched from the second connection to the first connection, the controller 170 or the inverter controller 430 may control a minimum operating frequency of the motor 230 to be the second reference frequency.

In this case, the first reference frequency may be greater than the first reference frequency. Alternatively, the first reference frequency may be equal to the second reference frequency, which will be described below with reference to FIG. 11.

Figure 11:
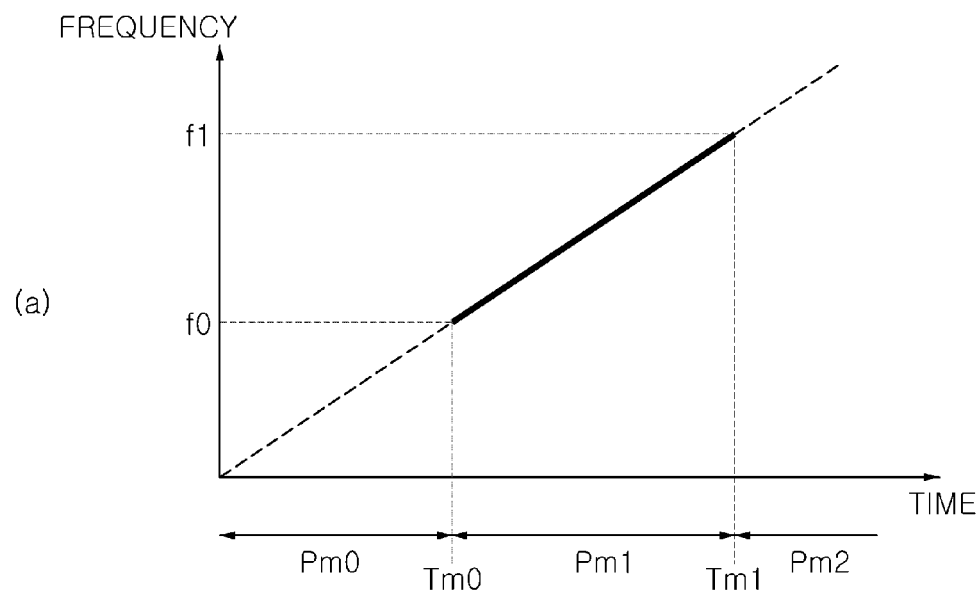
FIGS. 11 to 13B are diagrams referred to in the description of the operating method of FIG. 10.
Figure 11:
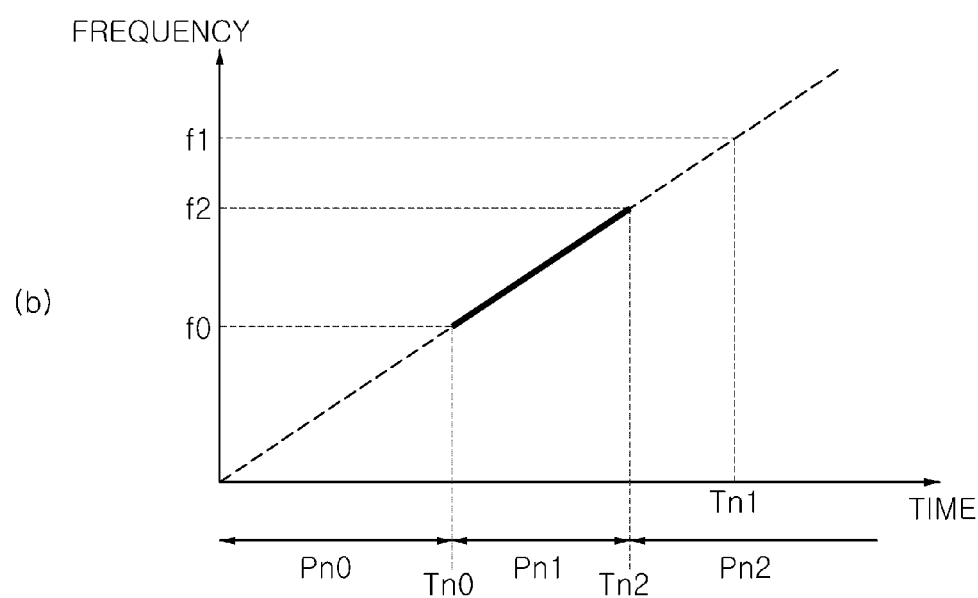

FIG. 11 illustrates an operating frequency range of the motor 230 when windings of the motor 230 are switched from the first connection to the second connection, and an operating frequency range of the motor 230 when windings of the motor 230 are switched from the second connection to the first connection.

Referring to the drawing, (a) of FIG. 11 illustrates an operating frequency range of f0 to f1 of the motor 230 during switching from the first connection to the second connection.

Referring to the drawing, (b) of FIG. 11 illustrates an operating frequency range of f0 to f2 of the motor 230 during switching from the second connection to the first connection.

Meanwhile, an induced voltage or a counter electromotive force is greater in the first connection than in the second connection, the controller 170 or the inverter controller 430 may control the operating frequency range of f0 to f1 of the motor 230, during switching of the windings of the motor 230 from the first connection to the second connection, to be greater than the operating frequency range of f0 to f2 of the motor 230 during switching from the second connection to the first connection. Accordingly, burnout of the switching device 450 for switching connection of windings of the motor 230 may be prevented, as well as burnout of the inverter 420.

Figure 12A:
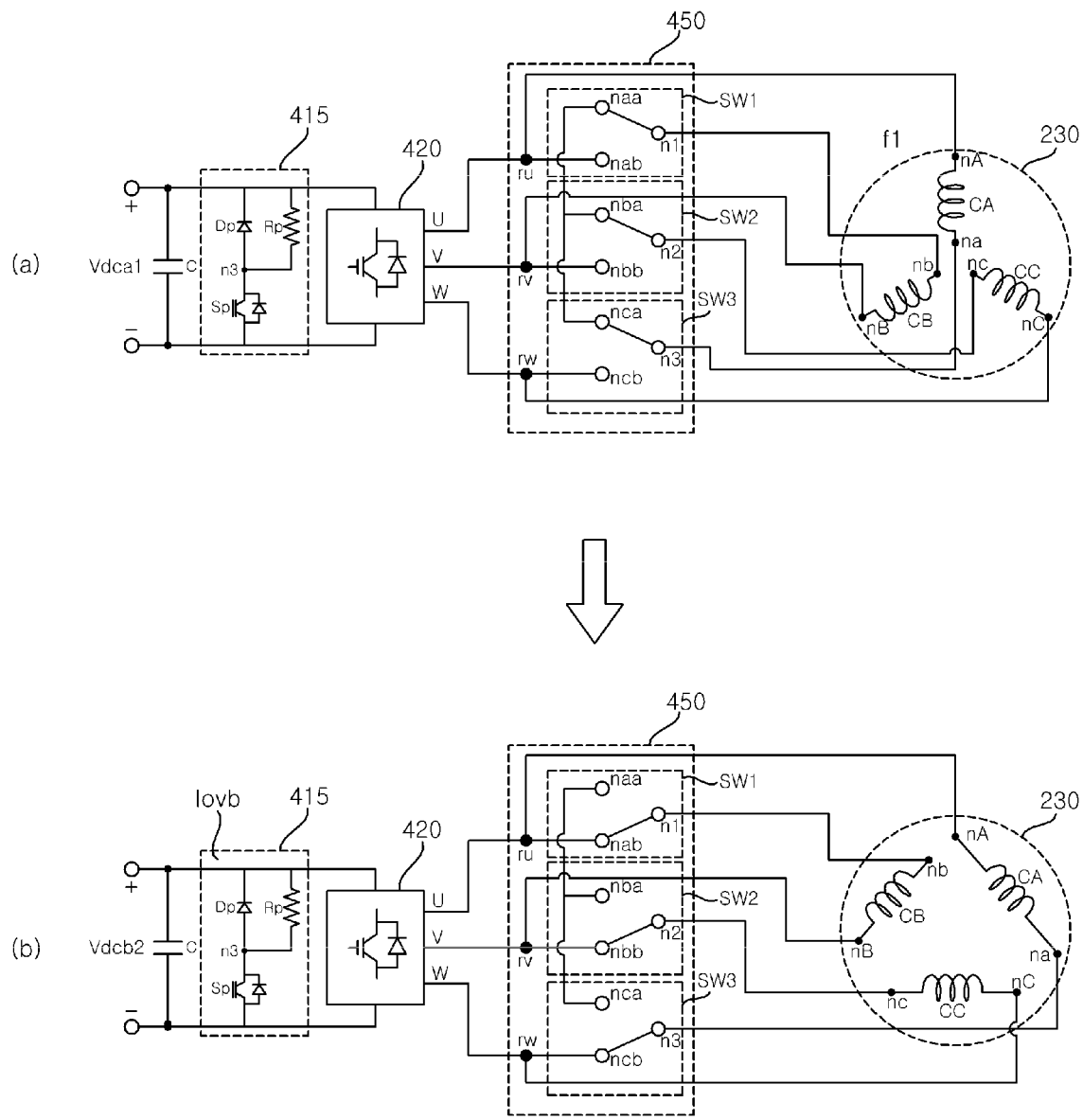

FIG. 12A illustrates an example in which during switching from the first connection to the second connection, the operating frequency of the motor 230 is the first frequency f1, such that burnout of the switching device 450 for switching connection of windings of the motor 230 may be prevented.

Figure 12B:
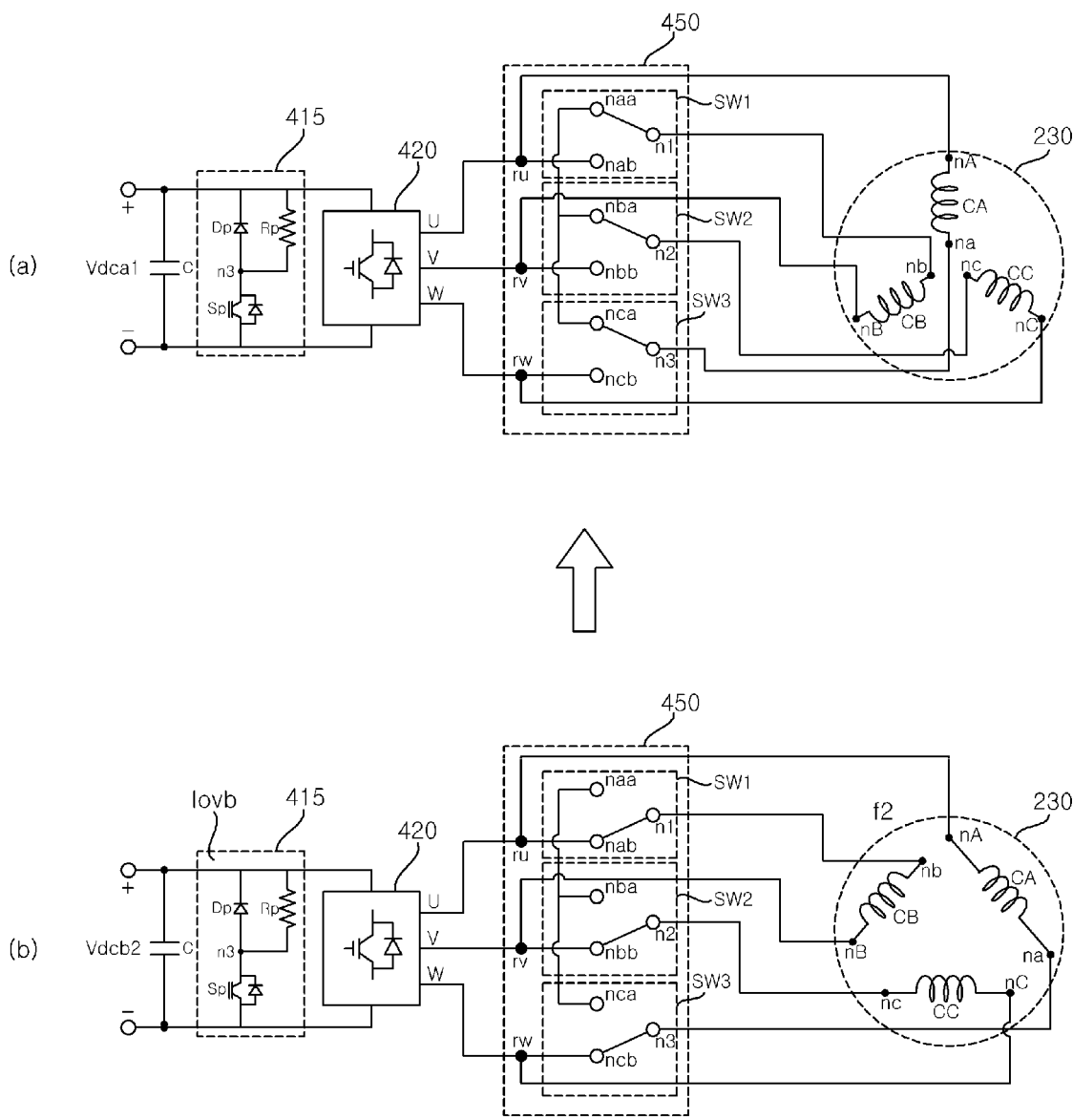

FIG. 12B illustrates an example in which during switching from the second connection to the first connection, the operating frequency of the motor 230 is the second frequency f2, such that burnout of the switching device 450 for switching connection of windings of the motor 230 may be prevented.

Figure 13A:
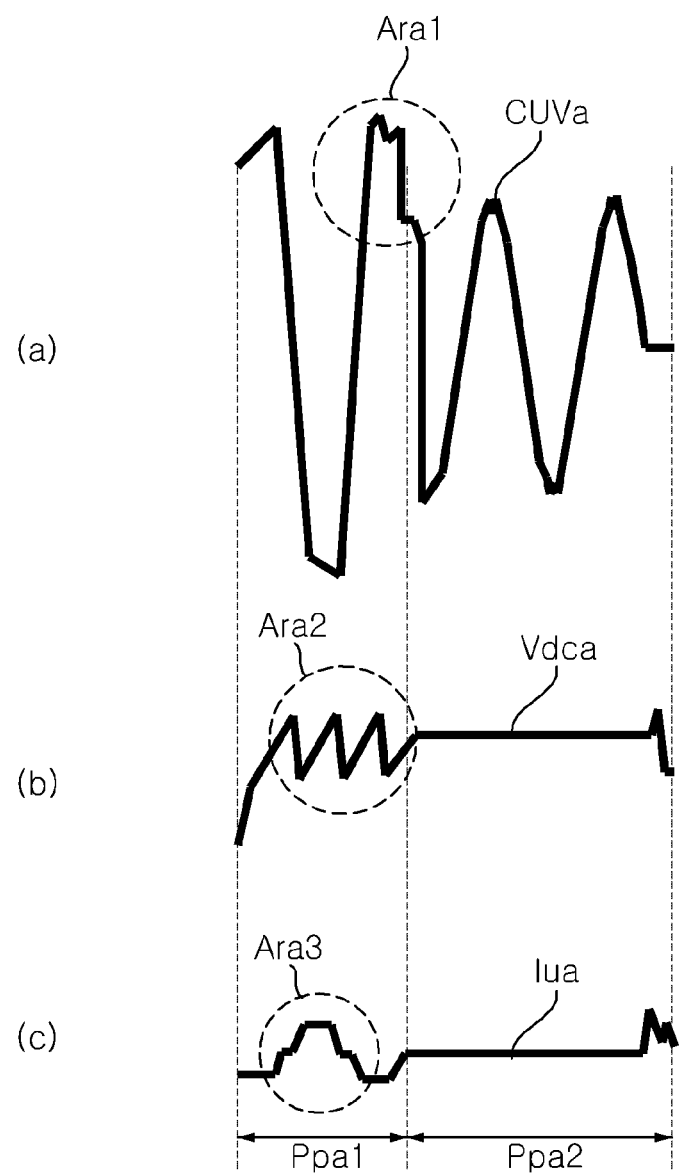

FIG. 13A illustrates a UV line-to-line voltage waveform CUVa, a dc terminal voltage waveform Vdca, and a U-phase current waveform Iua in the case where the brake chopper circuit 415 operates during switching from the first connection to the second connection, as illustrated in FIG. 9B.

For example, when the motor 230 operates at the operating frequency fx, which exceeds the maximum operating frequency f1, the brake chopper circuit 415 operates as illustrated in FIG. 9B.

In an interval Ppa1, in which the switching element Sp of the brake chopper circuit 415 is switched from OFF to ON, peak components, such as Ara1, Ara2, and Ara3, occur in the UV line-to-line voltage waveform CUVa, the dc terminal voltage waveform Vdca, and the U-phase current waveform Iua, respectively. Accordingly, the possibility of burnout of the switching device 450 and the inverter 240 may increase.

Meanwhile, in an interval Ppa2 following the interval Ppa1, the switching element Sp of the brake chopper circuit 415 is maintained in an ON state, such that no peak component occurs in the UV line-to-line voltage waveform CUVa, the dc terminal voltage waveform Vdca, and the U-phase current waveform Iua.

Figure 13B:
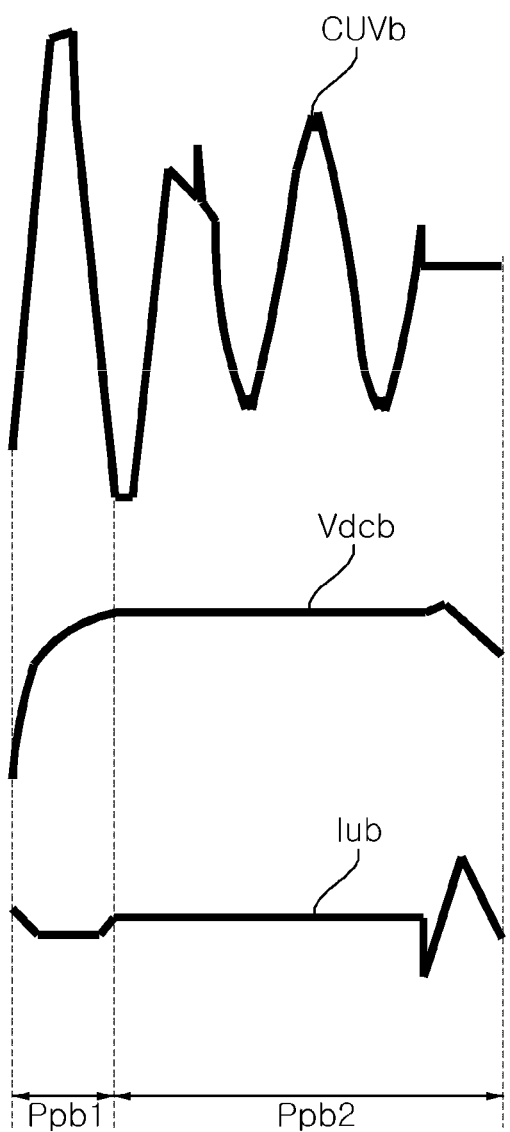

FIG. 13B illustrates a UV line-to-line voltage waveform CUVb, a dc terminal voltage waveform Vdcb, and a U-phase current waveform Iub in the case where the brake chopper circuit 415 does not operate during switching from the first connection to the second connection, as illustrated in FIG. 9C or 9D.

For example, in the case where the motor 230 operates at the operating frequency f1, which is the maximum operating frequency, the brake chopper circuit 415 does not operate as illustrated in FIG. 9C or 9D.

Accordingly, unlike FIG. 13A, during the intervals Ppb1 and Ppb2, no peak component occurs in the UV line-to-line voltage waveform CUVa, the dc terminal voltage waveform Vdca, and the U-phase current waveform Iua, such that the possibility of burnout of the switching device 450 and the inverter 420 may be significantly reduced.

Figure 14:
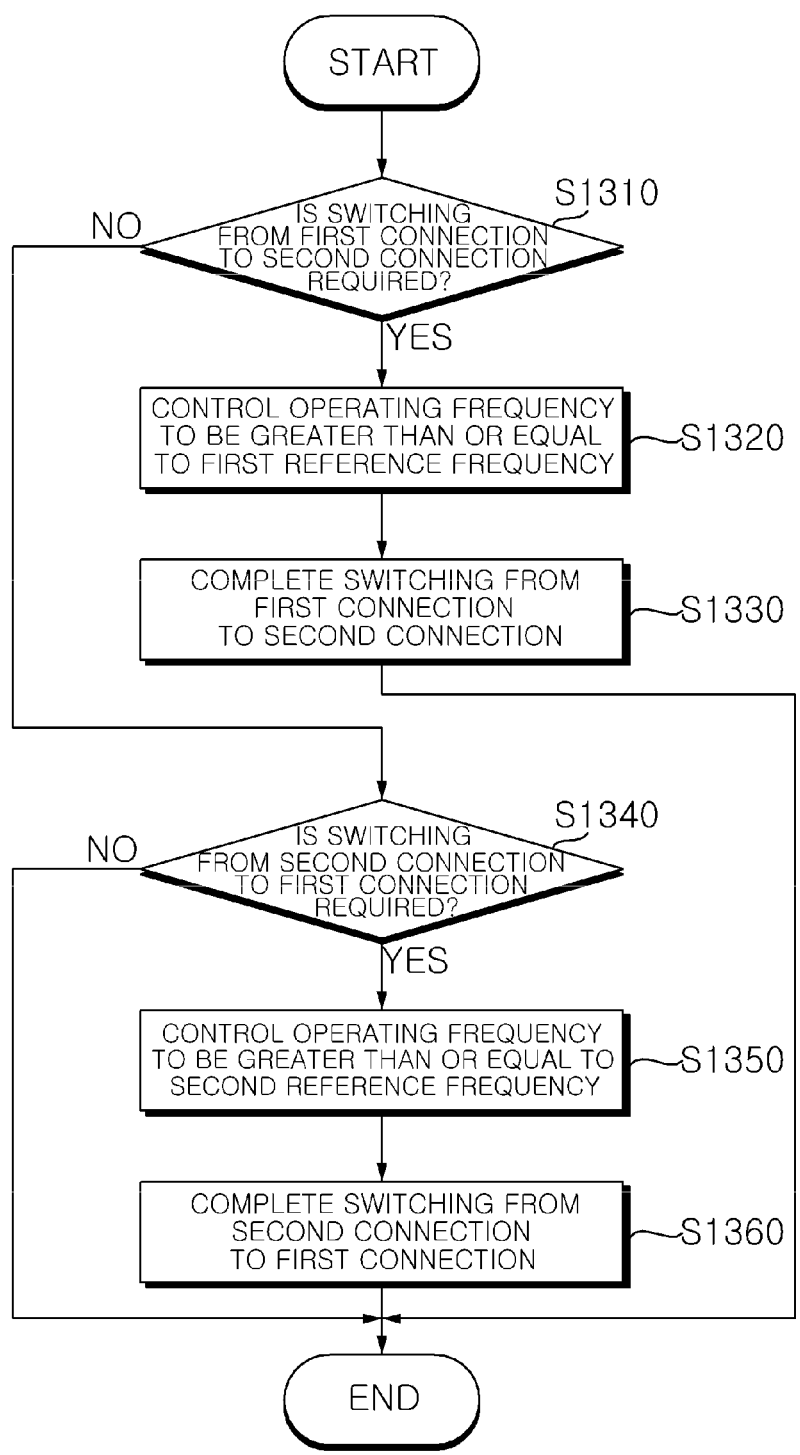
FIG. 14 is a flowchart illustrating an operating method of a motor driving apparatus according to another embodiment of the present disclosure.

FIG. 14 is a flowchart illustrating an operating method of a motor driving apparatus according to another embodiment of the present disclosure.

Referring to the drawing, the controller 170 or the inverter controller 430 determines whether switching from the first connection to the second connection is required (S1310).

For example, is the motor 230 is required to operate at a speed exceeding the first speed, the controller 170 or the inverter controller 430 may determine that switching from the first connection to the second connection is required.

Accordingly, the controller 170 or the inverter controller 430 may control the operating frequency of the motor 230 to be greater than or equal to the first reference frequency (S1320).

In this manner, burnout of the switching device 450 for switching connection of windings of the motor 230 may be prevented, as well as burnout of the inverter 420.

Then, the controller 170 or the inverter controller 430 may complete switching from the first connection to the second connection (S1330). That is, the controller 170 or the inverter controller 430 may control switching from (a) to (b) of FIG. 7.

Meanwhile, the controller 170 or the inverter controller 430 determines whether switching from the second connection to the first connection is required (S1340).

For example, if the motor 230 is required to operate at a speed less than or equal to the first speed, the controller 170 or the inverter controller 430 may determine that switching from the second connection to the first connection is required.

Accordingly, the controller 170 or the inverter controller 430 may control the operating frequency of the motor 230 to be greater than or equal to a second reference frequency (S1350).

Meanwhile, the first reference frequency may be greater than the second reference frequency. Alternatively, the first reference frequency may be equal to the second reference frequency, as illustrated in FIG. 11.

Then, the controller 170 or the inverter controller 430 may complete switching from the second connection to the first connection (S1360). That is, the controller 170 or the inverter controller 430 may control switching from (b) to (a) of FIG. 7.

Figure 15:
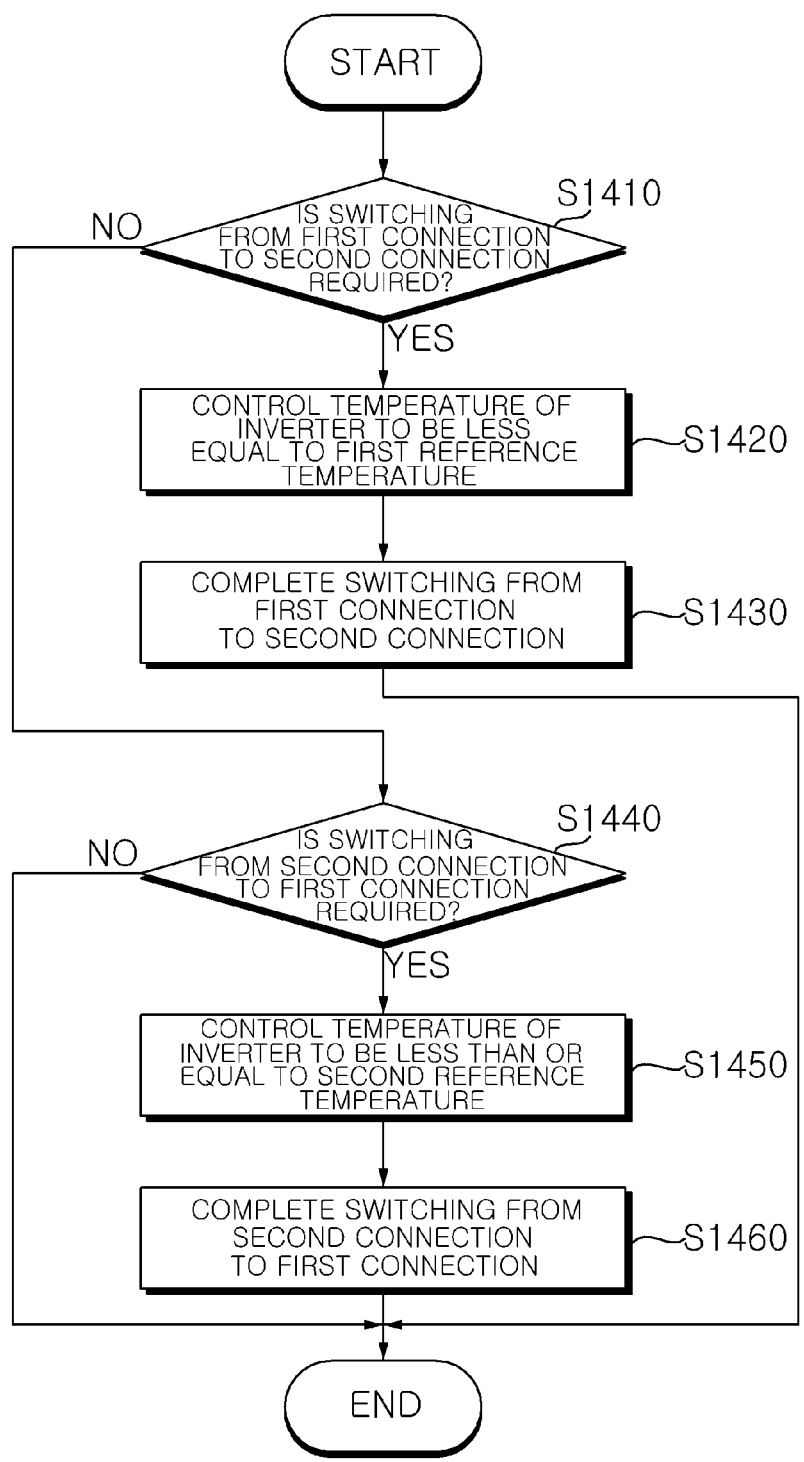
FIG. 15 is a flowchart illustrating an operating method of a motor driving apparatus according to another embodiment of the present disclosure.
Figure 16:
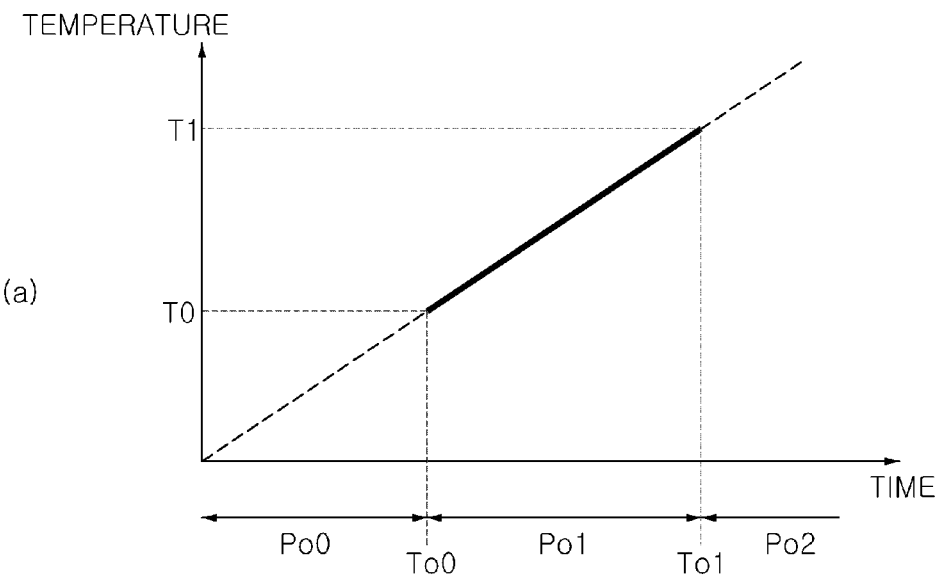
FIG. 16 is a diagram referred to in the description of the operation of FIG. 15.
Figure 16:
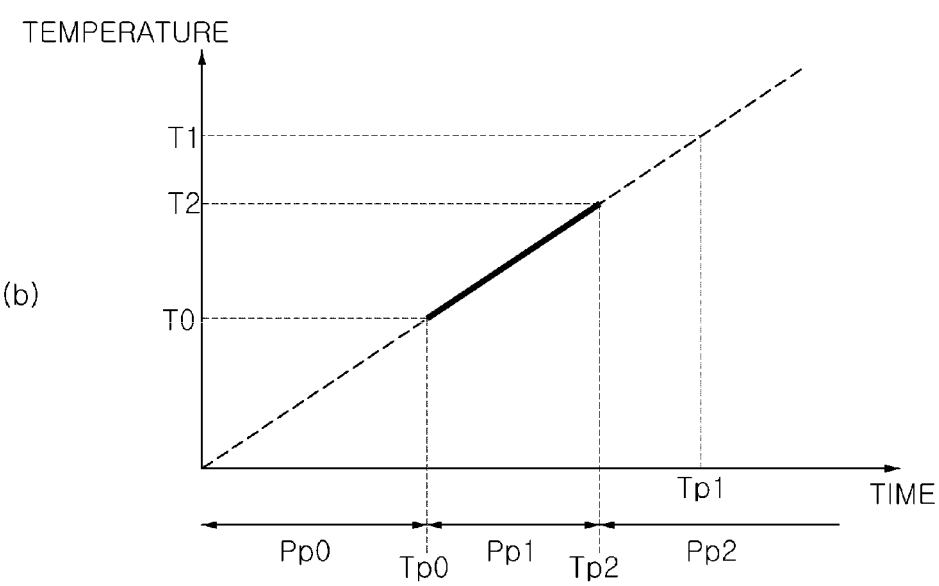

FIG. 15 is a flowchart illustrating an operating method of a motor driving apparatus according to another embodiment of the present disclosure; and FIG. 16 is a diagram referred to in the description of the operation of FIG. 15.

Referring to the drawing, the controller 170 or the inverter controller 430 determines whether switching from the first connection to the second connection is required (S1410).

For example, if the motor 230 is required to operate at a speed exceeding the first speed, the controller 170 or the inverter controller 430 may determine that the switching from the first connection to the second connection is required.

Accordingly, the controller 170 or the inverter controller 430 may control temperature of the inverter 420 to be less than or equal to a first reference temperature T1 (S1420).

In this manner, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control temperature of the inverter 420 to be less than or equal to the first reference temperature T1. Accordingly, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control an output of the inverter 420 to be stopped as illustrated in FIG. 9C or 9D. After the output of the inverter 420 is stopped, a regenerative current from the motor 230 is supplied to the dc terminal through the switching device 450 and the inverter 420. The controller 170 or the inverter controller 430 may control temperature of the inverter 420 to be less than or equal to the first reference temperature T1 during the supply of the regenerative current for the detected dc terminal voltage Vdc to be less than or equal to the allowable voltage. Accordingly, burnout of the switching device 450 for switching connection of windings of the motor 230 may be prevented, as well as burnout of the inverter 420.

Meanwhile, if the windings of the motor 230 are switched from the first connection to the second connection, the controller 170 or the inverter controller 430 may control temperature of the inverter 420 to be less than or equal to the first reference temperature T1 as illustrated in FIG. 9C or 9D, so that the switching element Sp in the brake chopper circuit 415 may not be turned on. Accordingly, it is possible to control the brake chopper circuit 415 at the dc terminal not to operate during the operation of the switching device 450. As a result, burnout of the switching device 450 for switching connection of windings of the motor 230 may be prevented.

Meanwhile, if the windings of the motor 230 are switched from the first connection to the second connection, the controller 170 or the inverter controller 430 may control an output of the inverter 420 to be stopped as illustrated in FIG. 9C or 9D. After the output of the inverter 420 is stopped, the controller 170 or the inverter controller 430 may control a first regenerative current from the motor 230 to be supplied to the dc terminal, and then a second regenerative current, which is lower than the first regenerative current, to be supplied to the dc terminal for the switching element Sp in the brake chopper circuit 415 not to be turned on. In this manner, it is possible to control the brake chopper circuit 415 not to operate during the operation of the switching device 450. As a result, burnout of the switching device 450 for switching connection of windings of the motor 230 may be prevented.

Then, the controller 170 or the inverter controller 430 may complete switching from the first connection to the second connection (S1430). That is, the controller 170 or the inverter controller 430 may control switching from (a) to (b) of FIG. 7.

Meanwhile, the controller 170 or the inverter controller 430 determines whether switching from the second connection to the first connection is required (S1440).

For example, if the motor 230 is required to operate at a speed less than or equal to the first speed, the controller 170 or the inverter controller 430 may determine that switching from the second connection to the first connection is required.

Accordingly, the controller 170 or the inverter controller 430 may control temperature of the inverter 420 to be less than or equal to a second reference temperature T2 which is lower than the first reference temperature T1 (S1450), as illustrated in FIG. 9G or 9H.

In this manner, burnout of the switching device 450 for switching connection of windings of the motor 230 may be prevented.

Meanwhile, if the windings of the motor 230 are switched from the second connection to the first connection, the controller 170 or the inverter controller 430 may control temperature of the inverter 420 to be less than or equal to the second reference temperature T2 as illustrated in FIG. 9G or 9H, so that the detected dc terminal voltage Vdc is less than or equal to the allowable voltage. Accordingly, burnout of the switching device 450 for switching connection of windings of the motor 230 may be prevented, as well as burnout of the inverter 420.

Meanwhile, if the windings of the motor 230 are switched from the second connection to the first connection, the controller 170 or the inverter controller 430 may control an output of the inverter 420 to be stopped as illustrated in FIG. 9G or 9H. After the output of the inverter 420 is stopped, a regenerative current from the motor 230 is supplied to the dc terminal through the switching device 450 and the inverter 420. The controller 170 or the inverter controller 430 may control temperature of the inverter 420 to be less than or equal to the second reference temperature T2 during the supply of the regenerative current for the detected dc terminal voltage Vdc to be less than or equal to the allowable voltage. Accordingly, burnout of the switching device 450 for switching connection of windings of the motor 230 may be prevented, as well as burnout of the inverter 420.

Meanwhile, if the windings of the motor 230 are switched from the second connection to the first connection, the controller 170 or the inverter controller 430 may control temperature of the inverter 420 to decrease to the second reference temperature T2 or less as illustrated in FIG. 9G or 9H so that the switching element Sp in the brake chopper circuit 415 may not be turned on. Accordingly, it is possible to control the brake chopper circuit 415 at the dc terminal not to operate during the operation of the switching device 450. As a result, burnout of the switching device 450 for switching connection of windings of the motor 230 may be prevented.

Meanwhile, if the windings of the motor 230 are switched from the second connection to the first connection, the controller 170 or the inverter controller 430 may control an output of the inverter 420 to be stopped as illustrated in FIG. 9G or 9H. After the output of the inverter 420 is stopped, the controller 170 or the inverter controller 430 may control a third regenerative current from the motor 230 to be supplied to the dc terminal, and then a fourth regenerative current, which is lower than the third regenerative current, to be supplied to the dc terminal for the switching element Sp in the brake chopper circuit 415 not to be turned on. In this manner, it is possible to control the brake chopper circuit 415 not to operate during the operation of the switching device 450. As a result, burnout of the switching device 450 for switching connection of windings of the motor 230 may be prevented.

Then, the controller 170 or the inverter controller 430 may complete switching from the second connection to the first connection (S1460). That is, the controller 170 or the inverter controller 430 may control switching from (b) to (a) of FIG. 7.

Meanwhile, if the windings of the motor 230 are switched from the first connection to the second connection, the controller 170 or the inverter controller 430 may control temperature of the inverter 420 to be greater than or equal to a first minimum temperature, and if the windings of the motor 230 are switched from the second connection to the first connection, the controller 170 or the inverter controller 430 may control temperature of the inverter 420 to be greater than or equal to a second minimum temperature.

In this case, the first minimum temperature may be greater than the second minimum temperature. Alternatively, the first minimum temperature may be equal to the second minimum temperature, which will be described below with reference to FIG. 16.

FIG. 16 illustrates an operable temperature range of the inverter 420 during switching from the first connection to the second connection, and an operable temperature range of the inverter 420 during switching from the second connection to the first connection.

Referring to the drawing, (a) of FIG. 16 illustrates an operable temperature range of T0 to T1 of the inverter 420 during from the first connection to the second connection.

Further, (b) of FIG. 16 illustrates an operable temperature range of T0 to T2 of the inverter 420 during switching from the second connection to the first connection.

As an induced voltage or a counter electromotive force is greater in the first connection than in the second connection, the controller 170 or the inverter controller 430 may control the operable temperature range of T0 to T1 of the inverter 420, during switching of the windings of the motor 230 from the first connection to the second connection, to be greater than the operable temperature range of T0 to T2 of the inverter 420 during switching from the second connection to the first connection. Accordingly, burnout of the switching device 450 for switching connection of windings of the motor 230 may be prevented, as well as burnout of the inverter 420.

The motor driving apparatus 220 according to the embodiments of the present disclosure described above with reference to FIGS. 4 to 16 may be applied to various home appliances, in addition to the air conditioner 100 of FIG. 1. For example, the motor driving apparatus 220 may be applied in various fields, such as a laundry handling apparatus (washing machine, dryer, etc.), a refrigerator, a water purifier, a robot cleaner, a robot, a vehicle, a drone, and the like.

The motor driving apparatus and the air conditioner including the same according to an embodiment of the present disclosure may include: a switching device disposed between an inverter and a motor; and a controller, which in response to the windings of the motor being switched from the first connection to the second connection, controls an operating frequency of the motor to be less than or equal to a first frequency, and in response to the windings of the motor being switched from the second connection to the first connection, controls an operating frequency of the motor to be less than or equal to a second frequency which is less than the first frequency. Accordingly, burnout of the switching device for switching connection of the motor windings may be prevented, as well as burnout of the inverter.

Meanwhile, the motor driving apparatus and the air conditioner including the same according to an embodiment of the present disclosure may further include: a DC terminal capacitor configured to store a DC terminal voltage; a DC terminal voltage detector configured to detect the DC terminal voltage; and a brake chopper circuit connected to both ends of the DC terminal capacitor and having a resistor and a switching element. Accordingly, burnout of the switching device for switching connection of the motor windings may be prevented, as well as burnout of the inverter.

Meanwhile, in response to the windings of the motor being switched from the first connection to the second connection, the controller may control the operating frequency of the motor to be less than or equal to the first frequency for the detected DC terminal voltage to be less than or equal to an allowable voltage. Accordingly, burnout of the switching device, switching connection of the motor windings, may be prevented as well as burnout of the inverter.

Meanwhile, in response to the windings of the motor being switched from the first connection to the second connection, the controller controls an output of the inverter to be stopped, wherein after the output of the inverter is stopped, a regenerative current from the motor is supplied to the DC terminal through the switching device and the inverter, and wherein the controller controls the operating frequency of the motor to be less than or equal to the first frequency during the supply of the regenerative current for the detected DC terminal voltage to be less than or equal to the allowable voltage. Accordingly, burnout of the switching device for switching connection of the motor windings may be prevented, as well as burnout of the inverter.

Meanwhile, in response to the windings of the motor being switched from the first connection to the second connection, the controller may control the operating frequency of the motor to decrease to the first frequency or less for the switching element in the brake chopper circuit not to be turned on. Accordingly, burnout of the switching device for switching connection of the motor windings may be prevented, as well as burnout of the inverter.

Meanwhile, in response to the windings of the motor being switched from the first connection to the second connection, the controller may control an output of the inverter to be stopped, and may control a first regenerative current from the motor to be supplied to the DC terminal, and then a second regenerative current, which is lower than the first regenerative current, to be supplied to the DC terminal for the switching element in the brake chopper circuit not to be turned on that after the output of the inverter is stopped. Accordingly, burnout of the switching device for switching connection of the motor windings may be prevented, as well as burnout of the inverter.

Meanwhile, in response to the windings of the motor being switched from the second connection to the first connection, the controller may control the operating frequency of the motor to be less than or equal to the second frequency for the detected DC terminal voltage to be less than or equal to the allowable range. Accordingly, burnout of the switching device for switching connection of the motor windings may be prevented, as well as burnout of the inverter.

Meanwhile, in response to the windings of the motor being switched from the second connection to the first connection, the controller may control an output of the inverter to be stopped, and wherein after the output of the inverter is stopped, a regenerative current from the motor may be supplied to the DC terminal through the switching device and the inverter, and wherein the controller may control the operating frequency of the motor to be less than or equal to the second frequency during the supply of the regenerative current for the detected DC terminal voltage to be less than or equal to the allowable voltage. Accordingly, burnout of the switching device for switching connection of the motor windings may be prevented, as well as burnout of the inverter.

Meanwhile, in response to the windings of the motor being switched from the second connection to the first connection, the controller may control the operating frequency of the motor to decrease to the second frequency or less for the switching element in the brake chopper circuit not to be turned on. Accordingly, it is possible to control the brake chopper circuit at the DC terminal not to operate during the operation of the switching device. As a result, burnout of the switching device for switching connection of the motor windings may be prevented.

Meanwhile, in response to the windings of the motor being switched from the second connection to the first connection, the controller may control an output of the inverter to be stopped, and may control a third regenerative current from the motor to be supplied to the DC terminal, and then a fourth regenerative current, which is lower than the third regenerative current, to be supplied to the DC terminal for the switching element in the brake chopper circuit not to be turned on that after the output of the inverter is stopped. Accordingly, it is possible to control the brake chopper circuit at the DC terminal not to operate during the operation of the switching device. As a result, burnout of the switching device for switching connection of the motor windings may be prevented.

Meanwhile, the controller may control an operating frequency range of the motor, during switching of the windings of the motor from the first connection to the second connection, to be greater than an operating frequency range of the motor during switching of the windings of the motor from the second connection to the first connection. Accordingly, burnout of the switching device for switching connection of the motor windings may be prevented, as well as burnout of the inverter.

Meanwhile, in response to the windings of the motor being switched from the first connection to the second connection, the controller may control the operating frequency of the motor to be greater than or equal to a first reference frequency, and in response to the windings of the motor being switched from the second connection to the first connection, the controller may control the operating frequency of the motor to be greater than or equal to a second reference frequency. Accordingly, burnout of the switching device for switching connection of the motor windings may be prevented, as well as burnout of the inverter.

Meanwhile, the motor driving apparatus and the air conditioner including the same according to an embodiment of the present disclosure may further include a temperature detector attached to the inverter and configured to detect temperature of the inverter, wherein in response to the windings of the motor being switched from the first connection to the second connection, the controller may control the temperature of the inverter to be less than or equal to the first reference temperature, and in response to the windings of the motor being switched from the second connection to the first connection, the controller may control the temperature of the inverter to be less than or equal to the second reference temperature which is higher than the first reference temperature. Accordingly, burnout of the switching device for switching connection of the motor windings may be prevented, as well as burnout of the inverter.

In order to achieve the above objects, a motor driving apparatus and an air conditioner according to another embodiment of the present disclosure may include: an inverter having a plurality of switching elements, and configured to output alternating current (AC) power to a motor based on a switching operation; a temperature detector attached to the inverter, and configured to detect temperature of the inverter; a switching device disposed between the inverter and the motor, and configured to switch windings of the motor to a first connection or a second connection; and a controller configured to control the inverter and the switching device, wherein in response to the windings of the motor being switched from the first connection to the second connection, the controller may control the temperature of the inverter to be less than or equal to a first reference temperature, and in response to the windings of the motor being switched from the second connection to the first connection, the controller may control the temperature of the inverter to be less than or equal to a second reference temperature which is higher than the first reference temperature. Accordingly, burnout of the switching device for switching connection of the motor windings may be prevented, as well as burnout of the inverter.

Meanwhile, the motor driving apparatus and the air conditioner including the same according to another embodiment of the present disclosure may further include: a DC terminal capacitor configured to store a DC terminal voltage; a DC terminal voltage detector configured to detect the DC terminal voltage; and a brake chopper circuit connected to both ends of the DC terminal capacitor and having a resistor and a switching element, wherein in response to the windings of the motor being switched from the second connection to the first connection, the controller controls the temperature of the inverter to be less than or equal to the second reference temperature for the detected DC terminal voltage to be less than or equal to an allowable voltage. Accordingly, it is possible to control the brake chopper circuit at the DC terminal not to operate during the operation of the switching device. As a result, burnout of the switching device for switching connection of the motor windings may be prevented.

Meanwhile, in response to the windings of the motor being switched from the first connection to the second connection, the controller may control an output of the inverter to be stopped, and wherein after the output of the inverter is stopped, a regenerative current from the motor may be supplied to the DC terminal through the switching device and the inverter, and wherein the controller may control the temperature of the inverter to be less than or equal to the second reference temperature during the supply of the regenerative current, the detected DC terminal voltage may be less than or equal to the allowable voltage. Accordingly, burnout of the switching device for switching connection of the motor windings may be prevented, as well as burnout of the inverter.

Meanwhile, in response to the windings of the motor being switched from the first connection to the second connection, the controller may control the temperature of the inverter to decrease to the first reference temperature or less for the switching element in the brake chopper circuit not to be turned on. Accordingly, burnout of the switching device for switching connection of the motor windings may be prevented, as well as burnout of the inverter.

Meanwhile, in response to the windings of the motor being switched from the first connection to the second connection, the controller may control an output of the inverter to be stopped, and may control a first regenerative current from the motor to be supplied to the DC terminal, and then a second regenerative current, which is lower than the first regenerative current, to be supplied to the DC terminal for the switching element in the brake chopper circuit not to be turned on that after the output of the inverter is stopped. Accordingly, it is possible to control the brake chopper circuit at the DC terminal not to operate during the operation of the switching device. As a result, burnout of the switching device for switching connection of the motor windings may be prevented.

Meanwhile, in response to the windings of the motor being switched from the second connection to the first connection, the controller may control the temperature of the inverter to be less than or equal to the second reference temperature for the detected DC terminal voltage to be less than or equal to the allowable voltage. Accordingly, burnout of the switching device for switching connection of the motor windings may be prevented, as well as burnout of the inverter.

Meanwhile, in response to the windings of the motor being switched from the second connection to the first connection, the controller may control an output of the inverter to be stopped, and wherein after the output of the inverter is stopped, a regenerative current from the motor may be supplied to the DC terminal through the switching device and the inverter, and wherein the controller may control the temperature of the inverter to be less than or equal to the second reference temperature during the supply of the regenerative current for the detected DC terminal voltage to be less than or equal to the allowable voltage. Accordingly, burnout of the switching device for switching connection of the motor windings may be prevented, as well as burnout of the inverter.

Meanwhile, in response to the windings of the motor being switched from the second connection to the first connection, the controller may control the temperature of the inverter to decrease to the second reference temperature or less for the switching element in the brake chopper circuit not to be turned on. Accordingly, it is possible to control the brake chopper circuit at the DC terminal not to operate during the operation of the switching device. As a result, burnout of the switching device for switching connection of the motor windings may be prevented.

Meanwhile, in response to the windings of the motor being switched from the second connection to the first connection, the controller may control an output of the inverter to be stopped, and may control a third regenerative current from the motor to be supplied to the DC terminal, and then a fourth regenerative current, which is lower than the third regenerative current, to be supplied to the DC terminal for the switching element in the brake chopper circuit not to be turned on that after the output of the inverter is stopped. Accordingly, it is possible to control the brake chopper circuit at the DC terminal not to operate during the operation of the switching device. As a result, burnout of the switching device for switching connection of the motor windings may be prevented.

Meanwhile, an operating method of the motor driving apparatus and the air conditioner according to the present disclosure can be realized as a processor-readable code written on a recording medium readable by a processor included in the motor driving apparatus and the air conditioner. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A motor driving apparatus, comprising:
an inverter that includes a plurality of switching elements, and is configured to output alternating current (AC) power to a motor based on a switching operation;
a switching device disposed between the inverter and the motor, and configured to switch windings of the motor to a first connection or a second connection; and
a controller configured to control the inverter and the switching device,
wherein the first connection corresponds to Y-connection, and the second connection corresponds to delta connection or Δ-connection, and
wherein the controller is configured to, (i) based on the windings of the motor being switched from the first connection to the second connection, control an operating frequency of the motor to be less than or equal to a first frequency, and (ii) based on the windings of the motor being switched from the second connection to the first connection, control the operating frequency of the motor to be less than or equal to a second frequency which is less than the first frequency.

2. The apparatus of claim 1, further comprising:
a DC terminal capacitor configured to store a DC terminal voltage;
a DC terminal voltage detector configured to detect the DC terminal voltage; and
a brake chopper circuit that is coupled to both ends of the DC terminal capacitor and includes a resistor and a switching element.

3. The apparatus of claim 2, wherein the controller is configured to, based on the windings of the motor being switched from the first connection to the second connection, control the operating frequency of the motor to be less than or equal to the first frequency such that the detected DC terminal voltage is less than or equal to an allowable voltage.

4. The apparatus of claim 2, wherein the controller is configured to, based on the windings of the motor being switched from the first connection to the second connection, stop an output of the inverter,
wherein the switching device and the inverter are configured to, based on the output of the inverter being stopped, guide a regenerative current from the motor to a DC terminal, and
wherein the controller is configured to, based on the regenerative current being supplied to the DC terminal, control the operating frequency of the motor to be less than or equal to the first frequency such that the detected DC terminal voltage is less than or equal to an allowable voltage.

5. The apparatus of claim 2, wherein the controller is configured to, based on the windings of the motor being switched from the first connection to the second connection, decrease the operating frequency of the motor to be less than or equal to the first frequency such that the switching element in the brake chopper circuit is not turned on.

6. The apparatus of claim 2, wherein the controller is configured to, based on the windings of the motor being switched from the first connection to the second connection, (i) stop an output of the inverter, and (ii) control a first regenerative current and a second regenerative current, which is lower than the first regenerative current, to be supplied to a DC terminal, such that the switching element in the brake chopper circuit is not turned on after the output of the inverter is stopped.

7. The apparatus of claim 2, wherein the controller is configured to, based on the windings of the motor being switched from the second connection to the first connection, control the operating frequency of the motor to be less than or equal to the second frequency such that the detected DC terminal voltage is less than or equal to an allowable voltage.

8. The apparatus of claim 2, wherein the controller is configured to, based on the windings of the motor being switched from the second connection to the first connection, stop an output of the inverter,
wherein the switching device and the inverter are configured to, based on the output of the inverter being stopped, guide a regenerative current from the motor to a DC terminal, and
wherein the controller is configured to, based on the regenerative current being supplied to the DC terminal, control the operating frequency of the motor to be less than or equal to the second frequency such that the detected DC terminal voltage is less than or equal to an allowable voltage.

9. The apparatus of claim 2, wherein the controller is configured to, based on the windings of the motor being switched from the second connection to the first connection, decrease the operating frequency of the motor to the second frequency or less such that the switching element in the brake chopper circuit is not turned on.

10. The apparatus of claim 2, wherein the controller is configured to, based on the windings of the motor being switched from the second connection to the first connection, (i) stop an output of the inverter, and (ii) control a third regenerative current and a fourth regenerative current, which is lower than the third regenerative current, to be supplied to a DC terminal, such that the switching element in the brake chopper circuit is not turned on after the output of the inverter is stopped.

11. The apparatus of claim 1, wherein the controller is configured to control an operating frequency range of the motor, during switching of the windings of the motor from the first connection to the second connection, to be greater than an operating frequency range of the motor during switching of the windings of the motor from the second connection to the first connection.

12. An air conditioner, comprising:
an inverter that includes a plurality of switching elements, and is configured to output alternating current (AC) power to a motor based on a switching operation;
a switching device disposed between the inverter and the motor, and configured to switch windings of the motor to a first connection or a second connection; and
a controller configured to control the inverter and the switching device,
wherein the first connection corresponds to Y-connection, and the second connection corresponds to delta connection or Δ-connection, and
wherein the controller is configured to, (i) based on the windings of the motor being switched from the first connection to the second connection, control an operating frequency of the motor to be less than or equal to a first frequency, and (ii) based on the windings of the motor being switched from the second connection to the first connection, control the operating frequency of the motor to be less than or equal to a second frequency which is less than the first frequency.

13. The air conditioner of claim 12, further comprising:
a DC terminal capacitor configured to store a DC terminal voltage;
a DC terminal voltage detector configured to detect the DC terminal voltage; and
a brake chopper circuit coupled to both ends of the DC terminal capacitor and including a resistor and a switching element.

14. The air conditioner of claim 13, wherein the controller is configured to, based on the windings of the motor being switched from the first connection to the second connection, control the operating frequency of the motor to be less than or equal to the first frequency such that the detected DC terminal voltage is less than or equal to an allowable voltage.

15. The air conditioner of claim 13, wherein the controller is configured to, based on the windings of the motor being switched from the first connection to the second connection, stop an output of the inverter,
wherein the switching device and the inverter are configured to, based on the output of the inverter being stopped, guide a regenerative current from the motor to a DC terminal, and
wherein the controller is configured to, based on the regenerative current being supplied to the DC terminal, control the operating frequency of the motor to be less than or equal to the first frequency such that the detected DC terminal voltage is less than or equal to an allowable voltage.

16. The air conditioner of claim 13, wherein the controller is configured to, based on the windings of the motor being switched from the first connection to the second connection, decrease the operating frequency of the motor to be less than or equal to the first frequency such that the switching element in the brake chopper circuit is not turned on.

* * * * *